United States Patent
Watanabe et al.

[11] Patent Number: 6,059,177
[45] Date of Patent: May 9, 2000

[54] WELDING METHOD AND WELDING MATERIAL

[75] Inventors: Osamu Watanabe, Chiba; Akihiko Ohta, Ibaragi; Chiaki Shiga, Ibaragi; Satoshi Nishijima, Ibaragi, all of Japan

[73] Assignee: Kawasaki Steel Corporation, Japan

[21] Appl. No.: 08/997,667

[22] Filed: Dec. 23, 1997

[30] Foreign Application Priority Data

Dec. 27, 1996 [JP] Japan ..................................... 8-350763
Sep. 5, 1997 [JP] Japan ..................................... 9-241562

[51] Int. Cl.$^7$ .............................. B23K 1/19; B23K 31/02; B23K 28/00
[52] U.S. Cl. .................... 228/262.41; 228/189; 228/200; 228/233.2
[58] Field of Search .................................. 228/120, 124.5, 228/262.4, 262.41, 200, 225, 226, 230, 231, 232, 189, 233.2

[56] References Cited

U.S. PATENT DOCUMENTS

| | | |
|---|---|---|
| 3,690,869 | 9/1972 | Potak et al. . |
| 3,767,388 | 10/1973 | Asakura et al. . |
| 3,860,456 | 1/1975 | Repas ..................................... 148/12 F |
| 4,121,953 | 10/1978 | Hull ........................................ 148/38 |
| 4,143,258 | 3/1979 | McCann et al. .......................... 219/73 |
| 4,363,660 | 12/1982 | Wakita et al. ......................... 75/128 B |
| 4,431,446 | 2/1984 | Yamamoto et al. ................... 75/128 A |
| 5,094,699 | 3/1992 | Feichtinger et al. .................... 148/12.1 |

FOREIGN PATENT DOCUMENTS

| | | |
|---|---|---|
| 2 112 823 | of 0000 | France . |
| 2 342 120 | of 0000 | France . |
| 54-130451 | 10/1979 | Japan . |
| 59-068571 | 4/1984 | Japan . |
| 2 130 948 | 6/1984 | United Kingdom . |

OTHER PUBLICATIONS

The Welding Handbook Eighth Edition, vol. 1, 1987.

*Primary Examiner*—Patrick Ryan
*Assistant Examiner*—Kiley Stoner
*Attorney, Agent, or Firm*—Austin R. Miller

[57] ABSTRACT

A welding method for two members adapted to be welded and formed of a low-alloy steel for structural purposes causing the weld metal to develop martensite transformation during cooling after welding, so that the weld metal becomes expanded to a greater degree at room temperature than at a temperature at which the martensite transformation initiates. The welding material comprises a ferrous alloy containing C, Cr, Ni, Si, Mn, Mo and Nb, all of which meet substantially with the contents of the following equation (1):

$$170 \leq 719 - (795 \times C\,wt\%) - (23.7 \times Cr\,wt\%) - \quad (1)$$
$$(26.5 \times Ni\,wt\%) - (35.55 \times Si\,wt\%) - (13.25 \times Mn\,wt\%) -$$
$$(23.7 \times Mo\,wt\%) - (11.85 \times Nb\,wt\%) < 250.$$

4 Claims, 17 Drawing Sheets

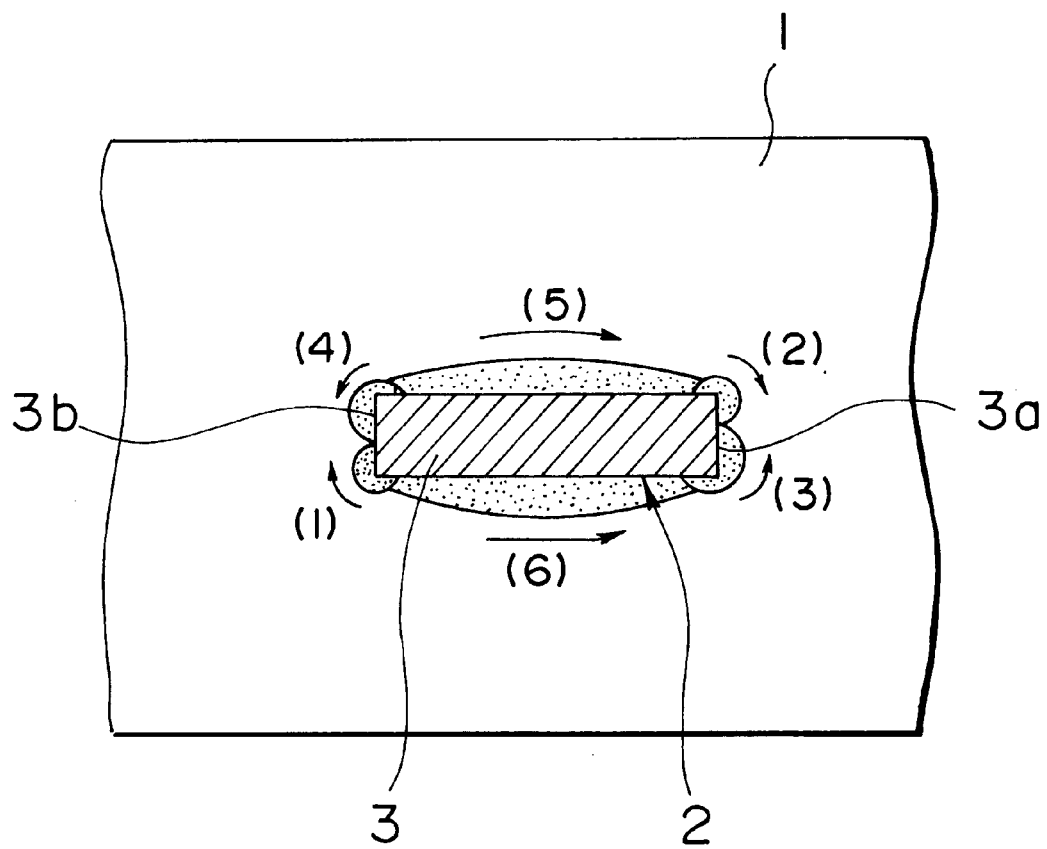

5

WELDING METHOD AND WELDING MATERIAL

BACKGROUND OF THE INVENTION

1. Field of the Invention

This invention relates to a welding method for use in building large-scale structures such as ships, bridges and the like. More particularly, the invention relates to a welding method which is highly capable of imparting improved fatigue strength to weld joints in the structures. The invention further relates to a special welding materials such as welding rod or welding wire and the like for the practice of the method.

2. Description of the Related Art

In recent years ships, marine structures, penstocks and the like have increased significantly in size. A demand has arisen for steel members having improved strength in order to attain weight saving. So-called low-alloy ferrous steels have hitherto been used that contain alloy elements such as Cr, Ni, Mo and the like in amounts of less than 3.0 wt %. Such steel members have a tensile strength of 30 to 120 kgf/mm$^2$.

To cope with the demand for strength improvement, steel members of greater strength may be selected from various low-alloy ferrous steels. The fatigue strength of such a high-strength low-alloy ferrous steel increases as the strength of the corresponding base metal increases. However, it is generally known that a weld joint derived from such low-alloy steel fails to attain improved fatigue strength even when the associated strength of weld joint is increased (please see Lecture Resumes of National Meeting, Welding Society of Japan, No. 52, Pages 256–257, 1993).

Consequently, a weld joint obtained from a high-strength steel shows the same level of fatigue strength as that of steel of a low strength. This presents the problem that, in the case of those structures calling for weld joints as by fillet welding, designed strength cannot be increased as desired, even with the use of a steel member of high strength. Excessively high residual tensile stress in the weld results in failure to achieve improved fatigue strength of the weld joint, even one resulting from use of such a high-strength steel member (please see Papers, Welding Society of Japan, Vol. 13, No. 3, Pages 438–443, 1995).

Another reason for the inability to improve fatigue strength is the fact that a weld joint derived from high-strength steel has great notch sensitivity. This problem, however, can be solved by using an improved welding process, or by increasing the radius of a weld toe through smooth grinding, or by use of a rotary cutter or the like as disclosed in Japanese Unexamined Patent Publication No. 5-69128.

Residual tensile stress occurs in weld zone of the joint. One reason for this is that a weld metal formed in the welding contracts during subsequent cooling. In FIG. 18 of the accompanying drawings, the weld metal is contracted in the course of cooling upon completion of welding of a low-alloy steel member using a conventional welding material formed from a low-alloy steel. This weld metal, after welding, causes thermal contraction in the direction indicated by the arrow in FIG. 18 of the drawings.

In such instance, when use is made of a welding material derived from conventional low-alloy steel, the weld metal thermally contracts and gradually declines in elongation (length) with temperature drop, but expands or increases in elongation (length) in the neighborhood of 500° C. This is because martensite transformation occurs at about 500° C. and subjects the weld metal to expansion. Upon completion of the martensite transformation, the weld metal again undergoes thermal contraction only and undergoes reduced elongation as the temperature declines. For its low yield stress, the weld metal is cooled under plastic deformation during cooling from the point of solidification to about 600° C. Plastic deformation serves to relax residual tensile stress arising from contraction of the weld metal. In the case of contraction at a temperature below 600° C., the weld metal suffers from high yield stress, thus becoming less likely to undergo plastic deformation, with ultimate introduction of residual tensile stress.

As is shown in FIG. 18, the weld metal cooling from 900° C. or 1000° C. contracts until it reaches a temperature of about 500° C. to 600° C. but then expands by virtue of martensite transformation in the course of cooling from about 500° C. to about 400° C., during which the residual tensile stress is relaxed. However, in the course of cooling to room temperature after martensite transformation thermal contraction takes place during the subsequent temperature drop to room temperature, and the resulting weld metal develops considerable residual tensile stress.

This explanation shows the chief cause for weld joint involvement in residual tensile stress. Where two different steel members to be welded have different sizes, for example as in fillet welding, any residual tensile stress is amplified due to the difference in heat capacity between the two steel members.

When a T-shaped joint is formed by fillet welding (as seen in FIG. 19A), a main plate 1 and a sub-plate 2 are welded in a lengthwise direction 4 and in the direction of arrow A as shown in FIG. 19B. During this welding, the temperatures of the main plate 1 and of the sub-plate 2 are gradually raised through the heat applied to the zone to be welded. When the sizes of the main plate 1 and of the sub-plate 2 are different from each other, the magnitudes of thermal diffusion vary as between the plates. When it has a smaller volume than that of the main plate 1, the sub-plate 2 experiences a larger temperature rise. Hence the amount of thermal expansion produced upon welding is greater in the sub-plate 2 than in the main plate 1. This leads to a difference in thermal expansion between the main plate 1 and the sub-plate 2 while welding the weld zone (1). This difference affects subsequent welding of a subsequent weld zone (2). Since the weld zone (2) is welded under such a difference in thermal expansion, a residual tensile stress takes place in the weld zone (2) during thermal contraction in cooling after welding.

Furthermore, where a joint is formed by bringing a sub-plate 2 into welded relation to a main plate 1 by swivel fillet welding as illustrated in FIGS. 20A and 20B, the sub-plate 2 may be swiveled in the order of a long side ((1) of FIG. 21)—a short side ((2) of FIG. 21)—((3) of FIG. 21) viewed from a cross section 3 of a weld zone thereof. According to the procedure of FIG. 21, welding is effected in two cycles of swiveling since the weld zone 3 of the sub-plate 2 is rather large in size. Also in this instance, the sub-plate 2 has a greater temperature rise because of its smaller volume than that of the main plate 1, and hence, the amount of lengthwise elongation is greater in the sub-plate 2 upon welding of the long side. Residual tensile stress thus takes place in the weld zone in the course of thermal contraction cooling after welding.

When the residual tensile stress resulting from the difference in thermal expansion between the main plate and the sub-plate is brought about concurrently with residual tensile stress arising from thermal contraction of the weld metal, as discussed previously, the resulting residual tensile stress often rises almost to the yield strength of the finished weld joint.

In order to reduce the residual tensile stress in a weld joint, one method has been disclosed in Japanese Unexamined Patent Publication No. 4-21717. A sub-plate is joined to a main plate by swivel fillet welding, followed by hammering the welding toe as by a shot peening, hammer peening or the like, thereby imparting compression stress to such toe and hence reducing the residual tensile stress in the welding toe. In this method, however, special after-weld treatment needs to be conducted after welding. Since machinery and operation not commonly used for welding are required, this prior art method can be said to be neither effective nor economical.

To reduce residual tensile stress in a weld zone, Japanese Unexamined Patent Publication No. 54- 130451 discusses a method wherein at least the final or outermost layer of a weld metal is welded with a welding material composed of an austenite type iron alloy, whereby martensite transformation is allowed to initiate at a temperature below room temperature, and the resulting weld is then cooled with use of liquid nitrogen, for example, at a temperature lower than −60° C. Also in the same method, cooling at a temperature of lower than −60° C. with liquid nitrogen is needed after common welding. In use of steel plates of especially large thickness, this is excessively tedious, expensive and time-consuming because it is necessary to cool all of the weld zone at −60° C. or below with liquid nitrogen.

SUMMARY OF THE INVENTION

The present invention has for its object to overcome the foregoing problems and to provide a welding method which creates weld joints having significantly enhanced fatigue strength with no need for hammering treatment or cooling treatment after completion of common welding. Another object of the invention is to provide a welding material suited for the practice of such welding method.

In accordance with the present invention, it has been discovered that great benefit and advantages are achieved by causing a weld metal to develop martensite transformation during cooling after the welding has been performed, causing the weld metal to expand to a greater degree at room temperature than it does at the initiation temperature of martensite transformation.

We have further discovered a welding material for use in such welding method, having greater expansion upon cooling to room temperature than it does at the martensite formation initiation temperature. It comprises a ferrous alloy containing critical proportions of C, Cr, Ni, Si, Mn, Mo and Nb, the proportions of all of which substantially meet the following equation (1):

$$170 \leq 719 - (795 \times C\,wt\%) - (23.7 \times Cr\,wt\%) - \\ (26.5 \times Ni\,wt\%) - (35.55 \times Si\,wt\%) - (13.25 \times Mn\,wt\%) - \\ (23.7 \times Mo\,wt\%) - (11.85 \times Nb\,wt\%) < 250 \quad (1)$$

The above and other features of the present invention, along with variations thereof, will be manifest from the following detailed description, and from the drawings, which are intended to be exemplary and not to define the scope of the invention, which is set forth in the appended claims.

BRIEF DESCRIPTION OF THE DRAWINGS

FIG. 4 is a view explanatory of another form of welding method according to the invention.

DESCRIPTION OF THE PREFERRED EMBODIMENTS

Figure 1:
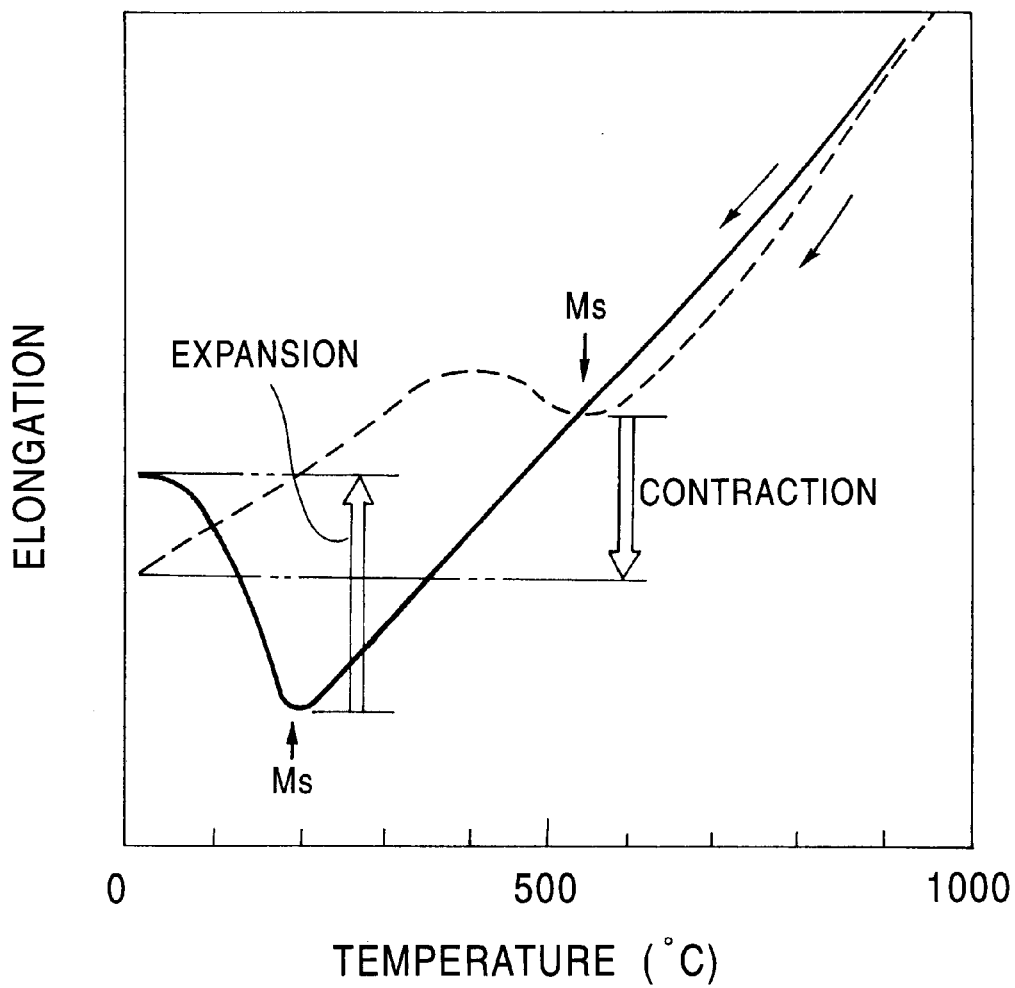
FIG. 1 is a plot of elongation versus temperature showing in solid line the cooling transformation of a welding material according to the present invention, and a comparable plot (as indicated by a broken line) showing the cooling curve of a welding material of the prior art.

The present invention is described hereinbelow in greater detail with reference to the drawings.

The invention relates to a welding method comprising welding two members formed of low-alloy steel for structural purposes with welding material, and causing a weld metal formed in the welding method to develop martensite transformation during cooling after welding, so that the weld metal expands to greater degree at room temperature than at the temperature at which martensite transformation was initiated.

On being subjected to martensite transformation during cooling, the ferrous alloy expands during the period of time from the initiation of martensite transformation to the time when the weld metal temperature drops to or near room temperature. In the present invention the weld metal produced by welding is caused to initiate martensite transformation in the course of cooling after welding, so that the weld metal expands to a greater degree at room temperature than at the temperature at which the martensite transformation was initiated. Such cool or cold expansion acts to relax the residual tensile stress that arose in the weld metal during cooling, or imparts to such weld metal a residual compression stress in place of a residual tensile stress. Thus, the resulting weld joint exhibits improved fatigue strength at weld joint working temperatures in common use.

In one form of welding method, the two steel members to be welded are partially welded at designated weld zones with a plurality of separate spaces left between, followed by subsequent welding at the spaces that were not initially welded.

In welding two steel members of different sizes, a difference in thermal expansion between both steel members arises because of varied temperature increases during the welding operation. This leads to varied amounts of contraction as between the two weld metals during cooling after welding, thus applying a residual tensile stress to the weld metal.

When two different steel members are joined to each other in the present invention, partial welding may first be provided with a multiplicity of predetermined spaces between two weld zones so that the two steel members are subjected to mechanical restraint at a number of welded points and at moderate temperatures. During subsequent welding at the spaced locations initially left unwelded, the welding materials rise in temperature but with a minimum difference in expansion at the time of welding since they are held in a restrained relation to each other at the above welding points. This gives a minimized difference of contraction between the two weld metals in the course of cooling after welding, eventually ensuring reduced residual tensile stress in the weld joint.

In one welding method of this invention, one of the two materials to be welded can be denominated as the main plate, and the other as a sub-plate; the main plate may be preheated at its weld zone before the welding begins, thereby attaining a higher temperature than at the welding site on the sub-plate. Before implementation of the welding method the weld zone of the main plate may be preheated to a higher temperature than that of the sub-plate; that is, the welding may be carried out with the main plate thermally expanded to a greater degree than the sub-plate. This enables realization of a minimized difference in thermal expansion between the main and sub-plate arising from varied temperature rise and restraint conditions between such plates, consequently reducing the tensile stress remaining in the finished weld joint.

In one highly advantageous welding method of this invention, the welding material is a ferrous alloy which initiates martensite transformation at a temperature between below about 250° C. and above about 170° C.

In FIG. 1 of the drawings, the transformation characteristics (as indicated by the solid line) of a weld metal according to the present invention are represented as compared to a counterpart (as indicated by broken line) of a weld metal of the prior art. The present invention contemplates using as a welding material formed from a ferrous alloy that initiates martensite transformation at a temperature less than about 250° C. but not less than about 170° C., with the result that, upon cooling, the resulting weld metal produces an increased amount of expansion while cooling from the temperature of martensite transformation. Moreover, such increased expansion amount occurs relatively close to room temperature so that the weld metal expands to a greater degree after completion of cooling than on initiation of martensite transformation. This means that residual compressive stress is introduced into the weld metal through such increased expansion to thereby decrease the residual tensile stress tending to occur in the course of cooling the weld metal. Thus, a finished weld joint is remarkably attained having greatly improved fatigue strength.

The temperature at which to initiate the martensite transformation is variable with the chemical composition of the steel member to be welded, and with that of the welding material. In the present invention, the steel member to be welded is a low-alloy steel, and the chemical composition of the welding material is so adjusted that the martensite transformation of weld metal is initiated at a temperature between less than 250° C. and not less than 170° C. The resulting weld metal can thus be subjected to martensite transformation at from less than 250° C. to not less than 170° C.

It is important that the temperature of initiation of martensite transformation should be less than about 250° C. The reason is that the higher the temperature of initiation of martensite transformation, the smaller the expansion that results from such martensite transformation. Accordingly, the maximum point of transformation expansion becomes substantially above room temperature so that thermal contraction occurs once again during subsequent cooling down to room temperature thereby losing the desirable results induced by transformation expansion, in the manner graphically illustrated by the broken line in FIG. 1.

Additionally, the martensite transformation-initiating temperature should not be lower than about 170° C. At lower temperatures than 170° C., even upon initiation of martensite transformation, the amount of transformation expansion obtainable up to completion of cooling is too small to gain desirable results derivable from the transformation expansion.

The welding material composition of the present invention is important and related to the practice of the welding method. This welding material comprises a ferrous alloy containing C, Cr, Ni, Si, Mn, Mo and Nb, the contents of which comply substantially with the conditions of the following equation:

$$170 \leq 719 - (795 \times C\,wt\%) - (23.7 \times Cr\,wt\%) - \qquad (1)$$
$$(26.5 \times Ni\,wt\%) - (35.55 \times Si\,wt\%) - (13.25 \times Mn\,wt\%) -$$
$$(23.7 \times Mo\,wt\%) - (11.85 \times Nb\,wt\%) < 250$$

It is generally known that martensite transformation-initiating temperatures (sometimes referred to as Ms points) of steel members are dependent upon the chemical compositions of the steel members. With regard to the relationship between the Ms points and the contents of various alloy elements, the following relationships have been found ("Effects of Alloy Elements and Transformation Temperatures on Stress Relaxation" by Murata et al., Papers of Welding Society of Japan, Vol. 9, No. 1, 1991):

$$Ms\,(^\circ C.) = 719 - 26.5 \times Nieq - 23.7 \times Creq;$$
$$Nieq = 30 \times C\,wt\% + 0.5 \times Mn\,wt\%;$$
$$Creq = Cr\,wt\% + Mo\,wt\% + 1.5 \times Si\,wt\% + 0.5 \times Nb\,wt\%.$$

When a weld joint is used at room temperature, the amount of expansion of the weld metal based on martensite transformation can be increased by use of, as a welding material, a ferrous alloy of a martensite transformation-initiating temperature between less than 250° C. and not less than 170° C. In this range a greater amount of expansion is attained in the vicinity of room temperature, and the weld metal thus becomes more greatly expandable after completion of cooling than when the temperature initiated the martensite transformation. Consequently, a residual compression stress is introduced into the weld metal owing to increased expansion, thereby reducing residual tensile stress tending to occur during cooling of the weld metal. Thus, the finished weld joint exhibits improved fatigue strength. For such reasons, those components contained in a ferrous alloy, namely C, Cr, Ni, Si, Mn, Mo and Nb, are so adjusted in their contents as to possess an Ms point less than 250° C. but not less than 170° C. A welding material having this specific ferrous alloy composition can produce a weld joint having very significantly enhanced fatigue strength. In one preferred form of welding material, the ferrous alloy contains C in an approximate amount of not more than about 0.10 wt %, Cr in an amount of about 8.0 to 13.0 wt %, Ni in an amount of about 5.0 to 12.0 wt %, Si in an amount of about 0.2 to 1.0 wt %, Mn in an amount of about 0.4 to 2.5 wt %, Mo in an amount of not more than about 4.0 wt % and Nb in an amount of not more than about 1.0 wt %.

We have discovered important reasons for each component of welding material to be limited in its content for the practice of this invention.

C: not more than about 0.10 wt %

The content of C is desired should be low in gaining increased weldability and decreased hardness of martensite. Moreover, the content of C should be not more than about 0.1 wt %, more preferably not more than about 0.06 wt % in precluding weld fracture.

The martensite transformation-initiating temperature specified above may be varied by adjustment of the contents of C, Cr, Ni, Si, Mn, Mo and Nb. Of these elements, Cr and Ni even when added in large amounts do not substantially affect workability in the production line concerned. Hence, it is desired that the martensite transformation-initiating temperature be controlled with the contents of Cr and Ni increased.

Cr: about 8.0 to 13.0 wt %

One reason for Cr to be controlled at not less than about 8.0 wt % in content is to ensure a martensite transformation-initiating temperature of less than about 250° C.; an amount of Cr below about 8.0 wt % needs larger amounts of Ni which increases costs, and also the use of other components which would lead to impaired workability in preparing a welded joint. Further, the content of Cr should be not more than about 13.0 wt % since a content above about 13.0 wt % causes a deleterious ferrite structure to appear on the welded metal.

Ni: about 5.0 to 12.0 wt %

One reason for the content of Ni to be controlled to from about 5.0 to 12.0 wt % is that, to hold the martensite transformation-initiating temperature at less than about 250° C., a content below about 5.0 wt % needs larger amounts of other components which would impair workability in producing a weld joint. Excessive Ni is costly and uneconomical; the content of Ni is about 12.0 wt % at its upper limit.

In preparing very thick welded joints of steel plates for use in ships, marine structures, penstocks, bridges and the like, those welding materials have heretofore been employed which contain Ni in an amount of less than about 3.0 wt % and Cr in an amount of less than about 1.0 wt %.

Si: about 0.2 to 1.0 wt %

The content of Si is controlled to from about 0.2 to 1.0 wt %. Si is added as a deoxidizing agent and hence is required to amount to not less than about 0.2 wt %. Above about 1.0 wt % leads to reduced workability of a steel member.

Mn: about 0.4 to 2.5 wt %

The content of Mn is within the range from about 0.4 to 2.5 wt %. Mn is used as a deoxidizing agent and hence is needed to be present at not less than about 0.4 wt %. Above about 2.5 wt % causes a decline of workability of a steel member.

Mo: not more than about 4.0 wt %

The content of Mo is controlled to be not more than about 4.0 wt %. Above about 4.0 wt % results in declined workability of steel member.

Nb: not more than about 1.0 wt %

The content of Nb is not more than about 1.0 wt %. Above about 1.0 wt % deteriorates workability of steel member.

With reference to the drawings, the present invention will now be further described.

Figure 2:
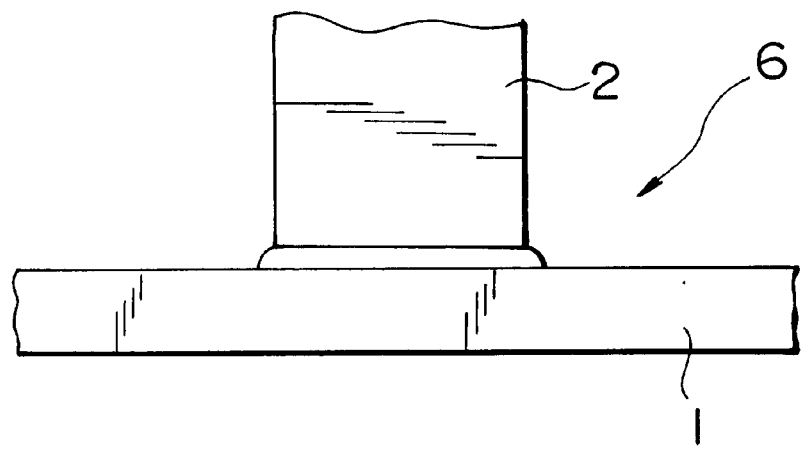
FIG. 2 is a side view of a main plate and a sub-plate held in welded relation to each other in the practice of the invention.

One example of this invention is shown in FIG. 2 of the drawings. It is directed to the formation of a weld joint in which a main plate 1 derived from a high-strength steel plate of the HT 780 MPa class (for example) is joined by the process of swivel fillet welding as shown in FIG. 2, to a sub-plate 2 derived from the same high-strength steel plate (referred to as rib plate 2).

As a welding material, the ferrous alloy was used which contained C in an amount of 0.025 wt %, Si in an amount of 0.33 wt %, Mn in an amount of 0.70 wt %, Ni in an amount of 10.0 wt %, Cr in an amount of 10.0 wt %, Mo in an amount of 0.13 wt % and Nb in an amount of 0.15 wt %. This welding material had an Ms temperature of about 190° C. and showed martensite transformation characteristics which behaved on cooling as indicated by the solid line in FIG. 1.

Here, Mo was added to attain resistance to corrosion. Neither Ni nor Cr amongst those components is present in conventional welding materials.

The main plate 1 was preheated at its weld zone and the surrounding area by means of a burner; that is, the main plate 1 was preheated at and near its weld zone at about 110° C. The weld zone alone of the main plate 1 were thereafter placed in abutted relation against the rib plate 2. Subsequently, the plates 1, 2 were joined to each other by swivel fillet welding of a semi-automatic gas-sealing type with use of the above welding material.

Figure 3:
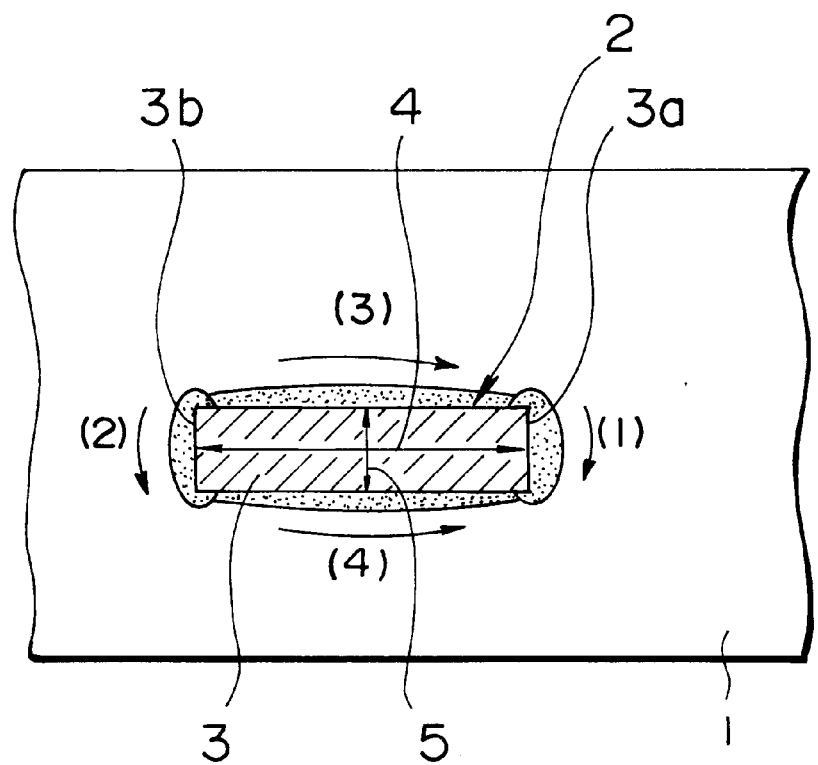
FIG. 3 is a sectional view exemplifying the procedure of a welding method according to the invention.

Such swivel fillet welding was performed, as seen in FIG. 3, in such a manner that the rib plate 2 was welded with its two end portions 3a, 3b (as designated at (1) and (2) in FIG. 3) in opposed relation to each other about a lengthwise direction 4. That is to say, the rib plate 2 was held in restrained relation to the main plate 1 at an extension of the lengthwise direction 4 as shown by the weld cross section 3 of the rib plate in FIG. 3.

Subsequently, lengthwise welding was effected at the areas along two long sides of the rib plate 2 (as designated at (3) and (4) In FIG. 3). Thus, the rib plate 2 was joined to the main plate 1 by fillet welding, whereby a weld joint 6 (FIG. 2) was made.

In that instance, the elongation induced from thermal expansion took place predominantly along the lengthwise direction 4, namely in the direction of a weld line along which the above long sides were welded. However, since the end portions 3a, 3b located along the weld cross section 3 of the rib plate 2 were mechanically restrained in relation to the main plate 1 by the previous welding, elongation was avoided while heating. Accordingly, the difference in thermal expansion based on varied restraint between the main plate 1 and the rib plate 2 was limited to a small degree. This is particularly true of the difference in thermal expansion exerted in the lengthwise direction 4 in the weld cross section 3 of the rib plate 2. The weld metal further underwent contraction in the course of cooling. As mentioned above, however, the weld metal when cooled to 190° C. was caused to develop martensite transformation and then expansion, and cooling was completed near room temperature, at which the weld metal expanded at the maximum (please see FIG. 1). Thus, the weld metal had a residual compression imparted to it, reducing its residual tensile stress.

Moreover, the above noted welding was performed after the main plate 1 had been preheated at its weld zones so as to expand to a slightly larger extent than at the weld zones of the rib plate 2. This caused a minimized difference in thermal expansion at the time of welding which resulted from the difference in temperature of the weld zones of both plates, ultimately leading to further reduction of residual tensile stress. In the weld joint 6 therefore, the residual tensile stress, that usually tended to occur in the vicinity of the resulting weld toes, decreased or was even converted to a residual compression stress. In consequence, the weld joint 6 demonstrated significantly enhanced fatigue strength without even needing extra after-weld treatments such as grinding or the like.

Further improvements, of course, can be made in the fatigue strength of the weld joint 6 by conducting extra treatments after welding, such as grinding and the like as in a known manner, and also by reducing notch sensitivity.

In the above described welding method of FIGS. 2 and 3, the end portions 3a, 3b (as indicated by (1) and (2) in FIG. 3) were first welded which are located oppositely of the lengthwise direction 4 in the weld cross section 3 of the rib plate 2, followed by welding along the long sides (as indicated by (3) and (4) in FIG. 3). In such case, it is desired that welding along the long sides be conducted while a weld metal applied to the end portions 3a, 3b (as indicated by (1) and (2) in FIG. 3) is being maintained at a temperature not exceeding its melting point but above its martensite transformation-initiating temperature. More specifically, let it be assumed here that welding is performed at sites at (3) and (4) after the weld metal applied to sites at (1) and (2) has cooled to a temperature lower than the martensite transformation-initiating temperature of the metal, and after a residual compression stress has been introduced in such weld metal. The residual compression stress subsequently becomes relaxed because the weld metal placed at an edge portion of (1) or (2) (at a corner in the weld cross section) is disadvantageously reheated while it is in a restrained condition, upon contact with freshly weld metal and upon to exposure to the heat of the latter metal. This reheating causes a decline in the above noted advantage accruing from transformation expansion at either one of the sites (1) and (2).

As contrasted, when either one of the sites (3) and (4) is welded while the metal welded to the sites (1) and (2) is being held at a temperature above the martensite transformation-initiating temperature, the weld metal applied to the site (1) or the site (2) is again heated before transformation expansion is developed by the weld metal of the sites (1) and (2). Thus, the residual tensile stress is effectively relaxed through the transformation expansion.

If it is difficult to bring welding to an end while all of the weld metals are still higher in temperature than their martensite transformation-initiating temperatures, then all such metals can be heated after completion of welding up to an austenitizing temperature, followed by cooling of the resulting metals. This enables all the weld metals simultaneously to commence their respective martensite transformations.

The procedure or sequence for welding is not limited to that illustrated in the foregoing FIG. 2 and 3 embodiment. For example, reference is made to FIG. 4. Among the end portions 3a, 3b that are placed crosswise of the lengthwise direction 4 in the weld cross section 3 of the rib plate 2, one pair of diagonally opposite corners (at (1) and (2) in FIG. 4) can be welded, followed by welding another pair of diagonally opposite corners (at (3) and (4) in FIG. 4). After the rib plate 2 has accordingly been mechanically restrained against elongation in the lengthwise direction 4 by the main plate 1, the remaining areas may be subsequently welded (at (5) and (6) in FIG. 4).

Figure 5A:
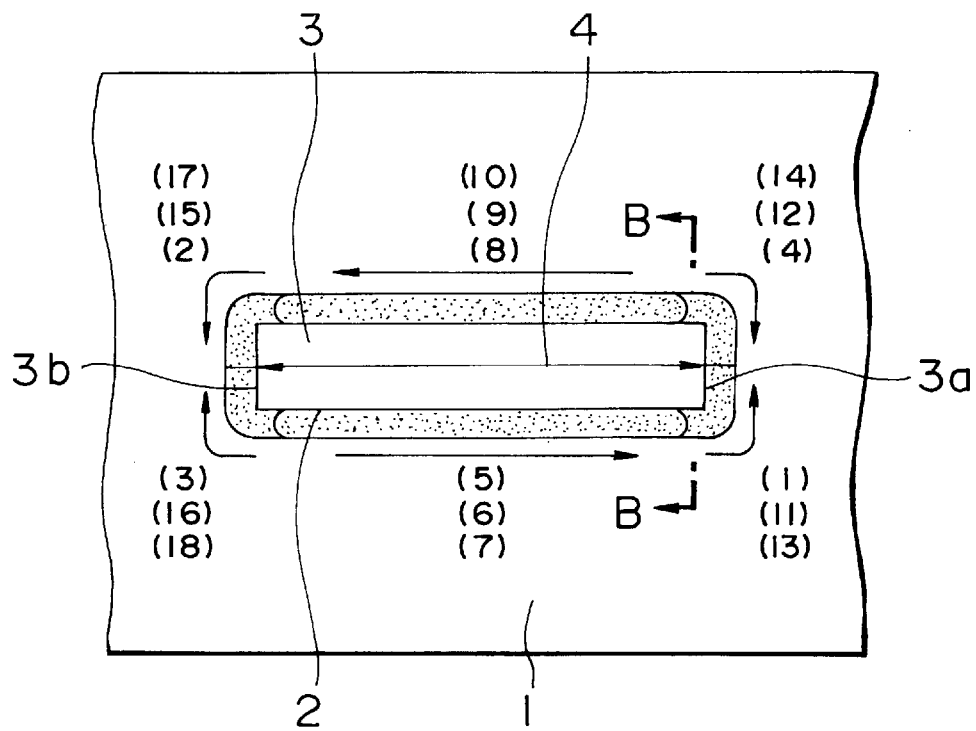
FIGS. 5A and 5B are views explanatory of still another form of welding method according to the invention, FIG. 5A being a plan view, and FIG. 5B being a cross-sectional view taken along the line B—B of FIG. 5A.
Figure 5B:
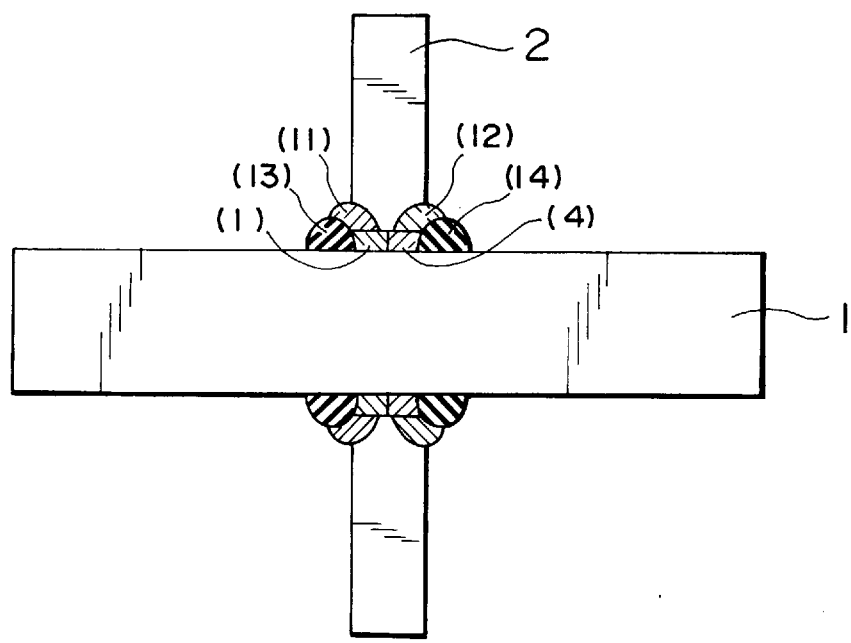

In the FIG. 3 embodiment the main plate 1 and the rib plate 2 was illustrated as being welded in a single-layered formation. However, the present invention may be practiced otherwise. For example, a three-layered formation is effective, as shown in FIGS. 5A and 5B. Numerals (1) to (18) in FIG. 5A denote chronological sequences of welding. In this form of welding, among the end portions 3a, 3b that are placed in opposed relation to the lengthwise direction 4 in the weld cross section 3 of the rib plate 2, one pair of diagonal corners (at (1) and (2) in FIG. 5A) are welded as a first layer, followed by welding of another pair of diagonal corners (at (3) and (4) in FIG. 5A) as a first layer, so that the rib plate 2 is restrained against elongation in the lengthwise direction 4 by the main plate 1. Three layers are thereafter welded (at (5), (6) and (7) and at (8), (9) and (10) in FIG. 5A). Finally, second and third layers (at (11) to (18) in FIG. 5A) are welded with regard to each of the two pairs of corners noted above.

It suffices that the rib plate 2 is restrained against elongation in the lengthwise direction by welding, as a first layer, of the two paired end portions opposed longitudinally of the rib plate 2. No particular restriction is applicable to subsequent sequences of welding.

FIG. 5B shows the manner in which three weld layers are laminated. In this form of lamination, a first layer is laminated (at (1) and (4) in FIG. 5B), a second layer is laminated along the weld zone of the first layer and toward the rib plate (at (11) and (12) in FIG. 5B), and a third layer is laminated on the main plate 1 (at (13) and (14) in FIG. 5B).

In such a multi-layered lamination, it is desired that the last layer be in contact with the main plate 1. This is necessary for residual compression stress to be at its maximum at a boundary between the main plate 1 and the weld zones (a welding toe) where fatigue cracking is most likely to take place. When such weld zones are heated during subsequent laminations in a range of lower temperatures than an austenitizing temperature, the resulting residual compression stress is caused to decrease.

For the same reason as stated above, and in order to carry out welding with the rib plate 2 sufficiently restrained in respect of its elongation in the lengthwise direction, it is preferred to laminate the last layer for the end portions positioned oppositely of the lengthwise direction of the rib plate 2 so that these end portions are finally subjected to solidification.

Although the embodiments previously discussed herein illustrate preheating the weld zone on a side of the main plate 1, the weld zones on a side of the rib plate 2 may also or alternatively be preheated to prevent weld fracture. In this instance, however, the rib plate 2 should desirably be heated at a lower temperature than is the main plate 1, as by shortening the heating time for the rib plate 2.

Figure 6:
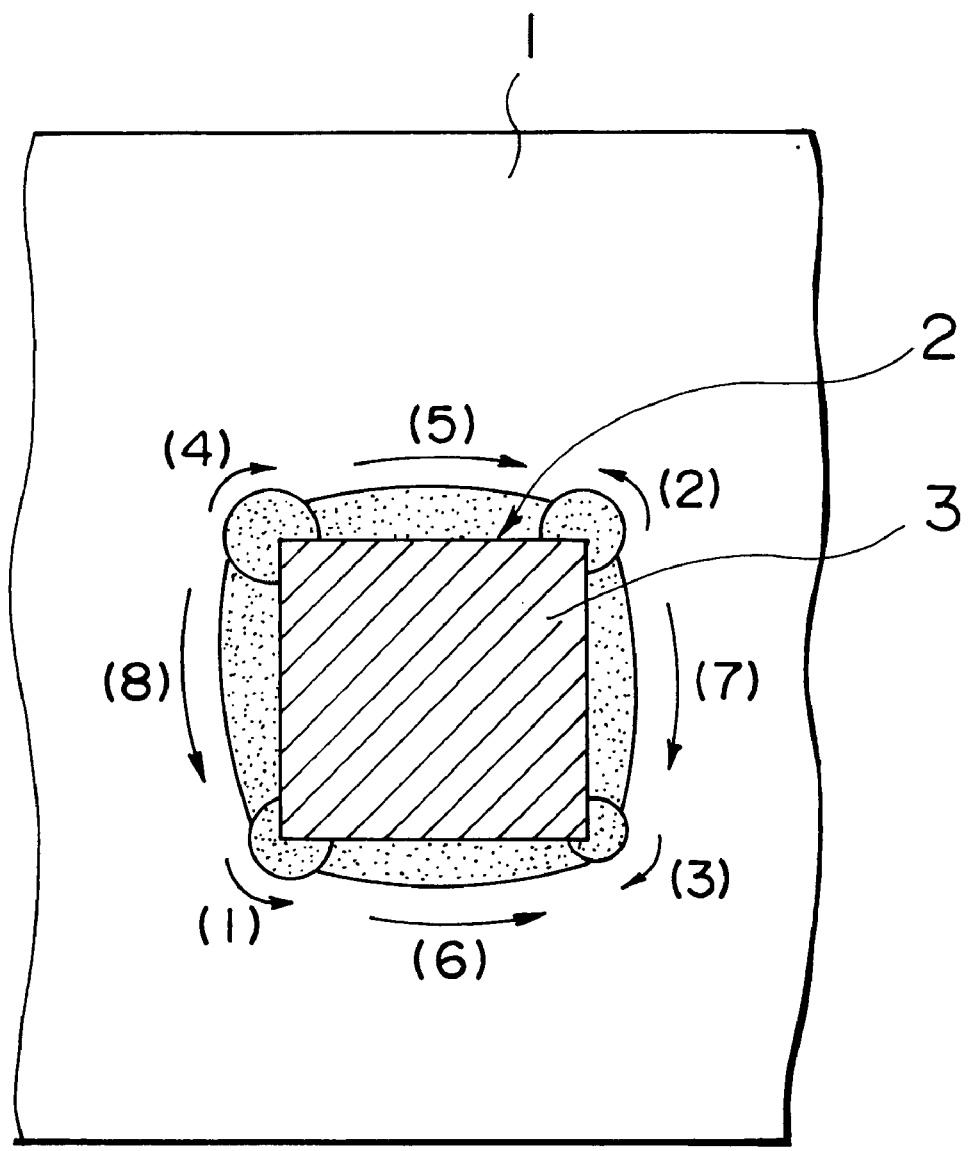
FIG. 6 is a sectional view exemplifying still another form of welding method according to the invention.

The procedure of joining by fillet welding is effective particularly in the case where the weld cross section 3 of the rib plate 2 for use as a sub-plate is of a rectangular shape. For example, the weld cross section 3 of the rib plate 2 may have a square shape or the like. The welding procedure for this square shape is illustrated in FIG. 6 in which the corners of the square are diagonally welded (at (1)-(2)-(3)-(4) in this order in FIG. 6) to thereby restrain the corners of the rib plate 2 with respect to the main plate 1, followed by welding of the remaining weld zones (5), (6), (7) and (8) in FIG. 6. This mode of welding allows the main plate 1 to restrain elongation that tends to occur in the direction of the weld line during welding of sides as at (5) of FIG. 6.

In the above mentioned embodiment, the main plate 1 and the sub-plate or rib plate 2 were formed of a high-strength steel member. This is for illustrative purposes, but not for restrictive purposes, as low-strength steel members are also suitably useful.

Figure 7:
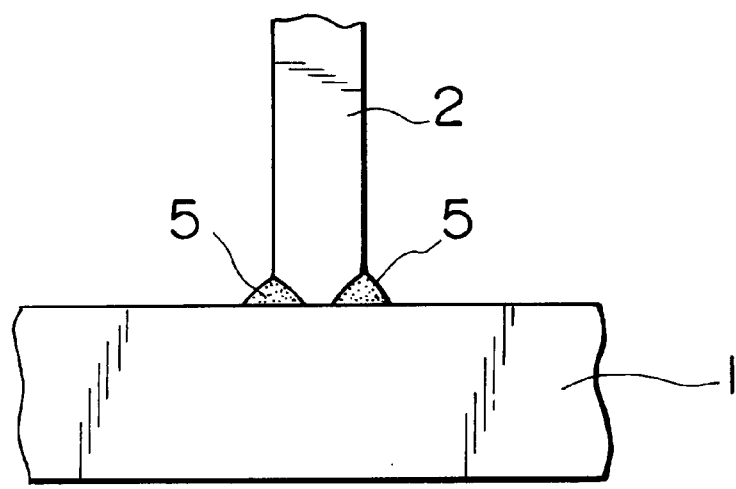
FIG. 7 is a side elevational view showing shaping and joining of a test plate according to the invention.

In addition, as shown in FIG. 7, the marginal edge of a weld zone of the rib plate 2 can preferably be subjected to beveling. FIG. 7 illustrates beveling applied to fillet welding of main plate 1 and rib plate 2 of either of the structures shown in FIG. 2 and FIGS. 3 and 4.

The beveling of FIG. 7 leads to an increased amount of weld metal 5 being applied to one weld zone, with eventual increase in compression stress obtained from transformation expansion.

Besides and preferably, beveling can be effected at the marginal edge of a weld zone of the rib plate 2, followed by shaping the welding with a gap δ (FIG. 8) of about 1 to about 5 mm, positioned between the surface of the main plate 1 and the tip of the rib plate 2.

Figure 8:
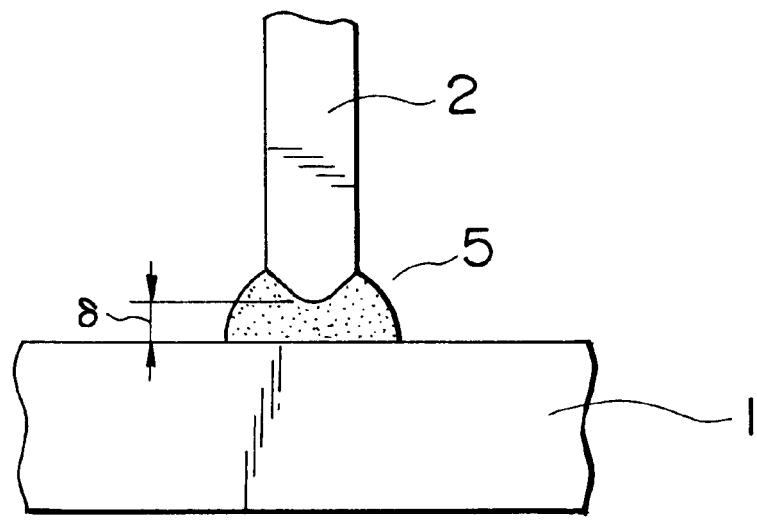
FIG. 8 is a view explanatory of beveling and gapping of a test plate according to the invention.

As a result of such FIG. 8 construction the amount of weld metal 5 to be applied to one weld zone is further increased so that the compression stress derived from transformation expansion is effectively enhanced.

In the FIG. 7 embodiment the beveling is employed in combination, but that specific arrangement is considered optional and may be omitted. But with a given gap defined between the surface of the main plate 1 and the tip of the rib plate 2, an increased amount of weld metal 5 can be attained.

Figure 9:
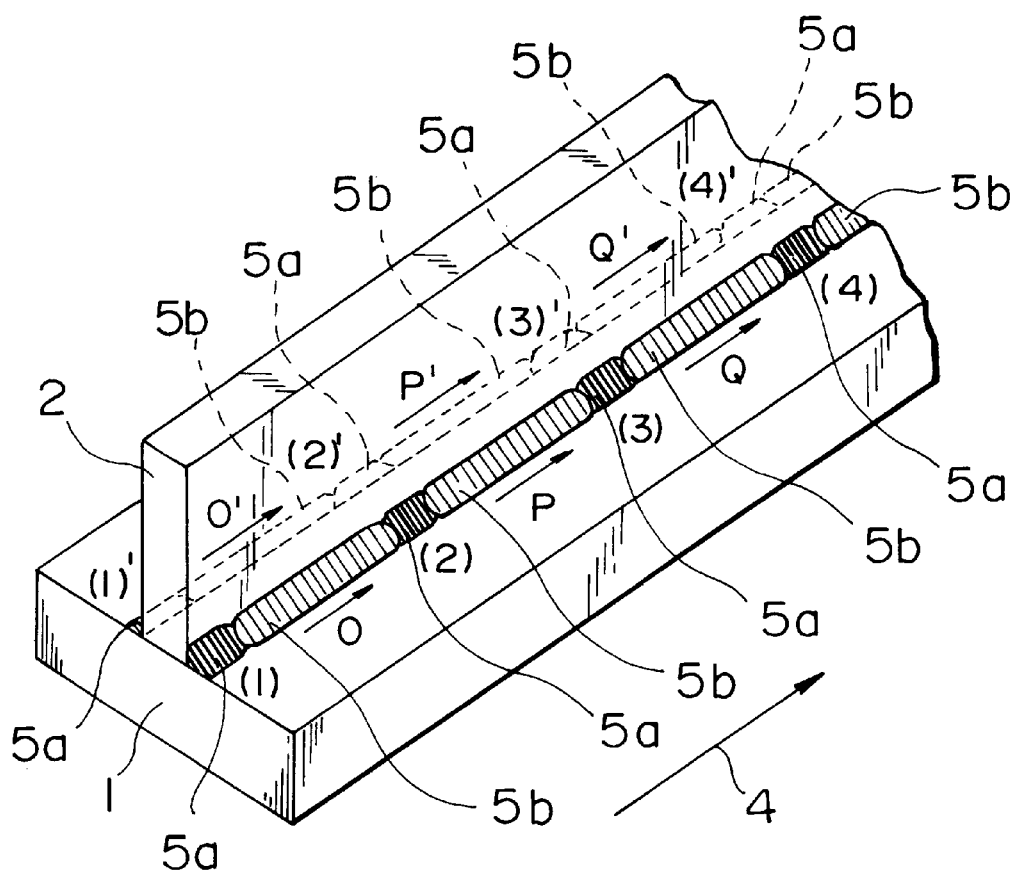
FIG. 9 is a view in perspective illustrating the manner in which a main plate and a sub-plate may be welded together into a T-shaped form in accordance with the invention.

FIG. 9 shows the use of a T-shaped embodiment in accordance with this invention. The same parts and materials as used in other embodiments are denoted here by the same reference numerals, and further explanation of the same is omitted.

In the FIG. 9 embodiment, the present invention is illustrated as being applied to the preparation of a T-shaped joint for use at room temperature by means of fillet welding. A main plate 1 and a sub-plate 2 are positioned in a T-shaped posture, and welding material is filled in those weld zones lying between the main plate 1 and the sub-plate 2. The welding material used is, for example, a ferrous alloy containing C in an amount of 0.025 wt %, Si in an amount of 0.33 wt %, Mn in an amount of 0.70 wt %, Ni in an amount of 10.0 wt %, Cr in an amount of 10.0 wt %, Mo in an amount of 0.13 wt % and Nb in an amount of 0.15 wt %. The welding material 5a is partially welded in one longitudinal area of welding in the order of (1)-(2)-(3)-(4) . . . in FIG. 9 and with predetermined spaces interrupting the welding. Also in another longitudinal area of welding located opposite to the sub-plate 2 in the direction of thickness and to the first weld zone, the weld metal 5 a is similarly partially welded in the order of (1)'-(2)'-(3)'-(4)'. . . in FIG. 9 and with predetermined spaces left along the weld zone. The sub-plate 2 is thus restrained mechanically by the main plate 1.

Subsequently, a weld metal 5b is disposed at one side in a lengthwise direction 4 and in the order of arrows O, P, Q. Also at the opposite side of plate 2, the weld metal 5b is likewise disposed along the direction 4 and in the order of arrows O', P', Q'. At this stage, the smaller sub-plate 2 attains a higher temperature, owing to the heat applied during the welding, than the temperature of the main plate 1. However, since the sub-plate 2 and the main plate 1 have been previously partially welded to each other (at (1)–(4) . . . and at (1)'–(4)'. . . in FIG. 9), the difference of thermal expansion is restrained as between the weld zone of the sub-plate 2 and that of the main plate 1. Residual tensile stress is thus significantly reduced, which is followed by varied contraction between the main plate 1 and the sub-plate 2 in the course of cooling after welding.

Furthermore, the welding material used is preferably the ferrous alloy heretofore defined. Upon cooling to 190° C. after the welding, the resultant weld metal undergoes martensite transformation and hence causes expansion during cooling from a martensite transformation-initiating temperature to room temperature. Hence, the weld metal relaxes residual tensile stress that tends to be introduced due to the contraction of that metal, or allows such tensile stress to be beneficially converted to a residual compression stress.

Desirably, prior to welding (before welding at (1) in FIG. 9), the sub-plate 2 can be preheated such that the temperature of this sub-plate at its weld zone is higher than that of the weld zone of the main plate 1. This contributes to minimized difference in temperature between the main plate 1 and the sub-plate 2 during the welding operation, ultimately resulting in the decline of residual tensile stress caused by varied differences in thermal expansion and hence in the abundance of residual compression stress to be introduced after completion of welding.

Also preferably, the welding operation can be brought to an end while all of the welding materials are still maintained above the corresponding martensite transformation-initiating temperature. If subsequent welding is conducted after the weld metal initially applied is cooled to below the martensite transformation-initiating temperature and then caused to introduce a compression stress, then the initial weld zone is allowed to contact fresh weld metal and heated by the heat of the latter weld metal. In this instance, the residual compression stress noted above becomes relaxed to decrease the advantages derived from transformation expansion of the initial weld zone.

Another embodiment of the invention is described with reference to FIGS. 10A, 10B and 11 of the drawings. The same parts and materials as used in the earlier described embodiments are denoted here by the same reference numerals, and further explanation of the same is omitted.

Figure 10A:
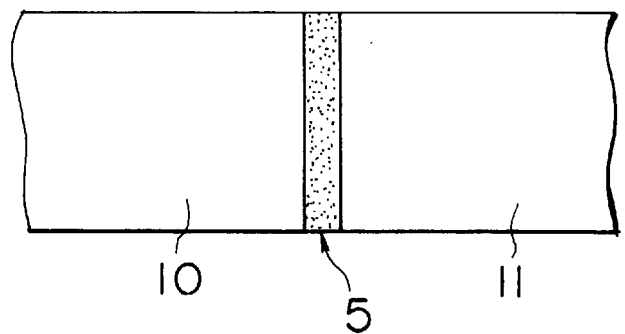
FIGS. 10A and 10B are views of one form of the invention as used for butt welding, FIG. 10A being a plan view, and FIG. 10B being a side elevational view, both partially in section.
Figure 10B:
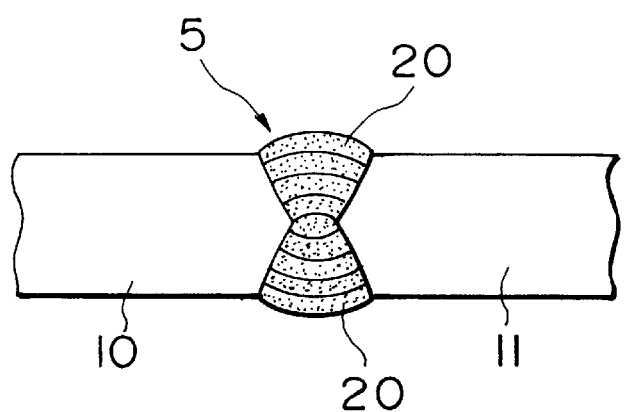

In the FIG. 10A embodiment, the present invention is illustrated as being applied to butt welding. Two steel plates 10, 11 especially those of a large thickness adapted to be welded are abutted at their respective ends and welded while providing a space 5 therebetween, with a number of weld layers superposed therein.

Because both plates have a markedly large thickness, individual weld metals are superimposed in the space from both sides about a center of the plate thickness. Namely, the plates have on both sides, among other layers, final or outermost layers 20 (FIG. 10B).

The weld metal used in butt welding is such welding material as illustrated in the FIGS. 2 and 3; that is, use is made of a welding material having a character in which martensite transformation expansion reaches its maximum near room temperature in the course of cooling.

Accordingly, residual tensile stress caused by thermal contraction due to the weld metal is relaxed by the transformation expansion. To this end, it is desired that subsequent welding be effected over the weld metal previously disposed while the latter metal is still being maintained at a higher temperature than the martensite transformation-initiating temperature. Effective relaxation of residual stress is thus made possible by means of the transformation expansion of the previously weld metal.

Figure 11:
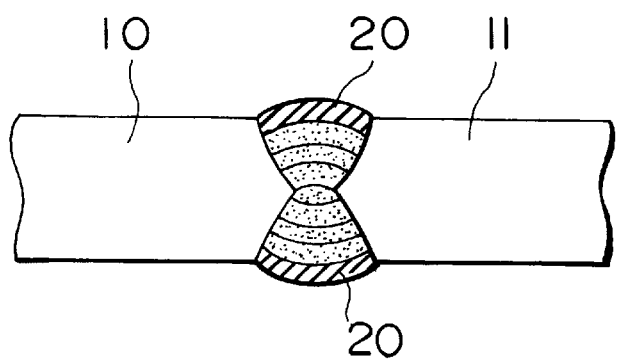
FIG. 11 is a view partially in section of an alternative form of the invention, as used for butt welding.

As illustrated in FIG. 11, the welding material of the FIGS. 2 and 3 embodiment can be used repeatedly or only for the outermost layer 20 (as hatched in FIG. 11), whereas conventional welding material may be utilized for the interior layers. Such construction is sometimes less excellent in performance, but transformation expansion still effectively relaxes residual stress occurring in the region directly under the outermost welded layer 20 where such residual stress maximizes in a direction crossing the direction of welding (the direction of plate thickness). This leads to substantially improved joint strength over standard weld joints.

Figure 12A:
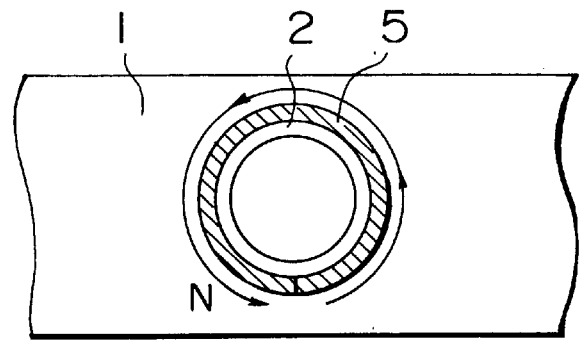
FIGS. 12A, 12B, 12C and 12D are views partially in section of pipe-shaped sub-plates provided according to the invention, FIG. 12A being a plan view, FIG. 12B being a side elevational view of FIG. 12A, FIG. 12C being a plan view, and FIG. 12D being a side elevational view of FIG. 12C.
Figure 12B:
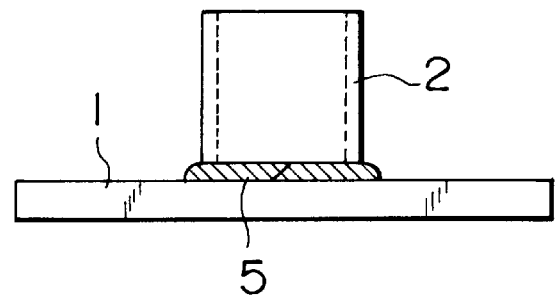
Figure 12C:
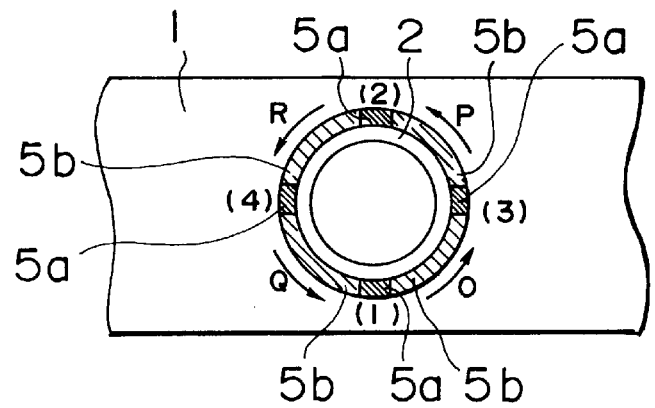
Figure 12D:
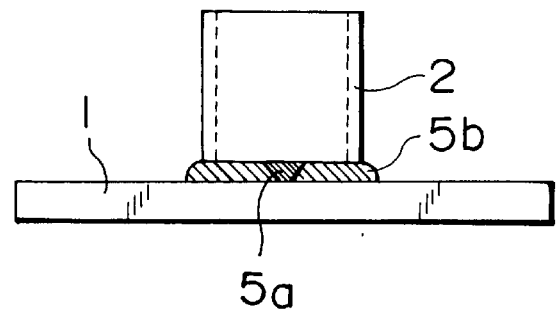

As is apparent from FIGS. 12A to 12D, the welding method of this invention is also applicable to a sub-plate 2 of a pipe-like form. As seen in FIGS. 12A and 12B, welding can be performed in a single stage as indicated by the arrow N with use of the welding material described in connection with the FIGS. 2 and 3 embodiment. As an alternative form, as illustrated in FIGS. 12C and 12D, a conventional welding material may be utilized in part. As concerns the welding procedure, the weld metal 5a may be disposed partially with given spaces defined (at (1)–(4) in FIG. 12C), followed by welding of the remaining weld metal 5b in the order of arrows O, P, Q, R. The welding procedure of FIGS. 12C and 12D may be followed with use of the welding material described in connection with the FIGS. 2 and 3 embodiment.

Alternatively, the present invention is effectively useful in the preparation of a criss-crossed weld joint, a weld joint for tetrahedral assembly boxes and a weld H-shaped steel as illustrated in FIG. 13A to FIG. 13D, FIGS. 14A and 14B and FIGS. 15A and 15B, respectively. As shown in FIG. 13A and FIG. 13B, FIG. 14A and FIG. 15A, weld joints may be formed with use of the welding material described in connection with the FIGS. 2 and 3 embodiment. It is also acceptable that by the use of a conventional welding material, a weld metal 5a may be partially applied in advance, and a weld metal 5b then filled in as seen in FIGS. 13C and 13D, FIG. 14B and FIG. 15B. In order to effect the welding procedures of FIGS. 13C and 13D, FIG. 14B and FIG. 15B, the welding material of the FIGS. 2 and 3 embodiment is useful and provides improved results.

Figure 16:
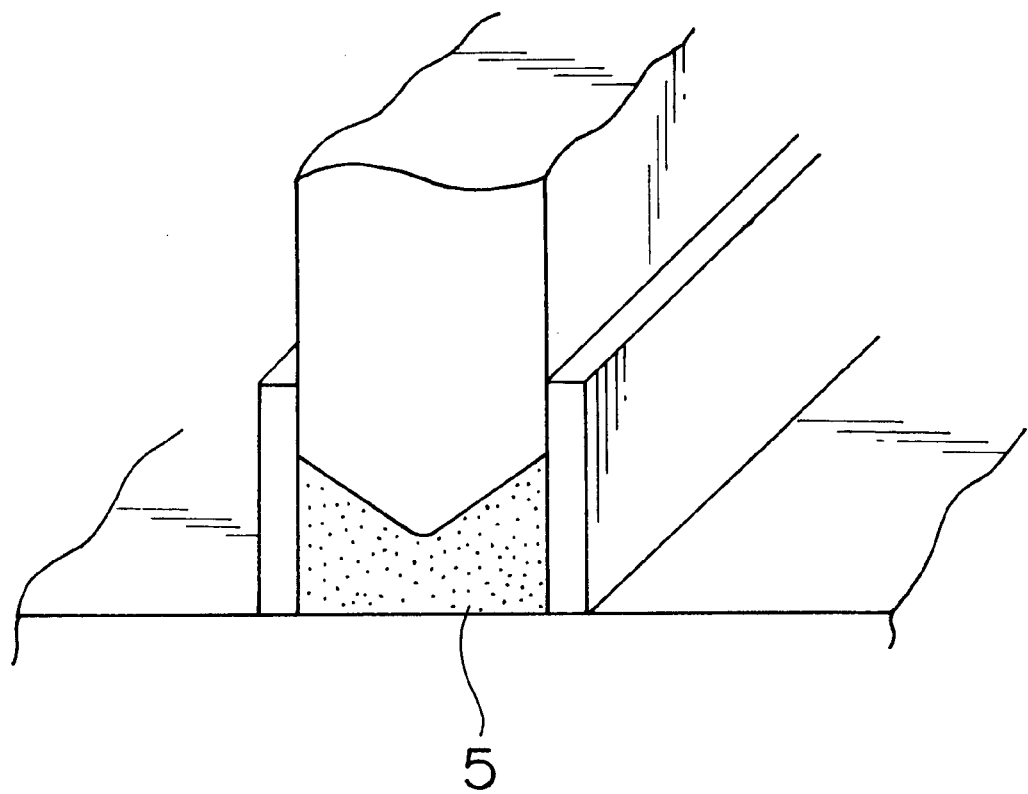
FIG. 16 is a view showing one form of the invention as used for electroslug welding.

The welding method of the present invention, designed to use the welding material shown in the FIGS. 2 and 3 embodiment, is not limited to arc welding, but may be used in other forms including electroslug welding as shown in FIG. 16.

Additionally, the welding material illustrated in the FIGS. 2 and 3 embodiment may be utilized for repair purposes, for example for rejoining steel members that have suffered fatigue cracking, and for padding failed matrices.

EXAMPLES

To assess improvements in fatigue strength tests were conducted on weld joints made by fillet welding.

By use of fillet welding according to the present invention, and by use of conventional fillet welding, comparative weld joints were prepared by joining a main plate 1 of 20 mm in plate thickness and HT 780 MPa in strength and a rib plate 2 (a sub-plate) of the same size and strength as in the main plate. The relative dimensions of the main plate 1 and of the rib plate 2 were as shown in FIGS. 20A and 20B, and the rib plate 2 was welded on both sides of the main plate 1.

Figure 19A:
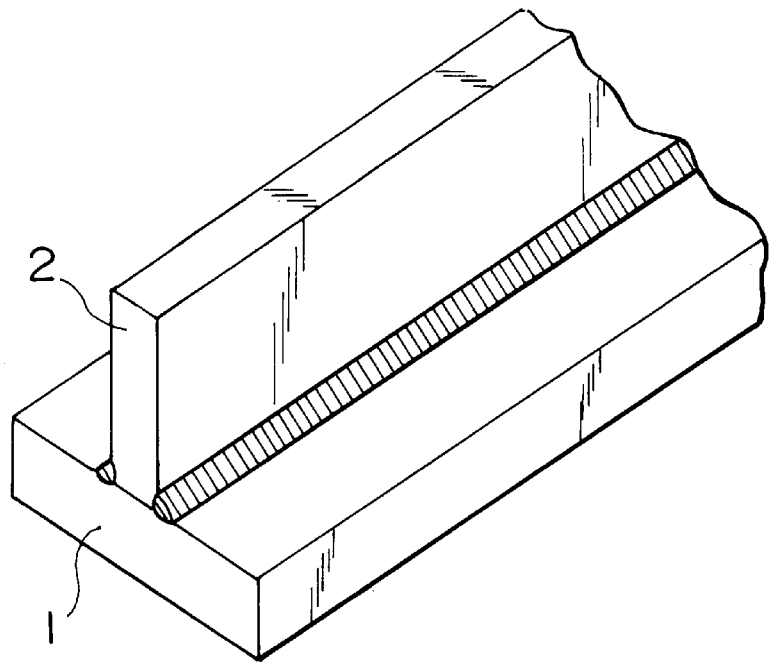
FIGS. 19A and 19B are views explanatory of the manner in which a T-shaped joint may be produced by fillet welding, both views being in perspective.
Figure 20A:
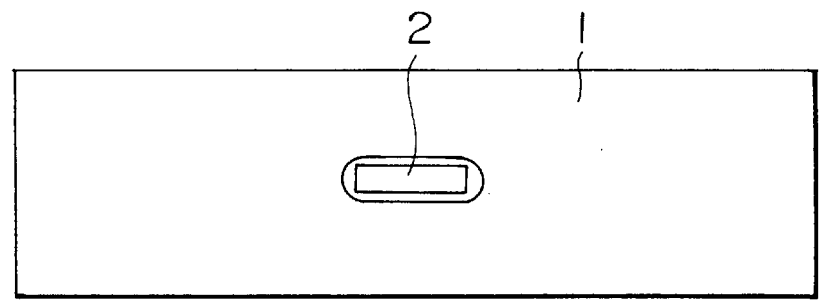
FIGS. 20A and 20B are views explanatory of welding according to the invention, FIG. 20A being a plan view and FIG. 20B being a side-elevational view.
Figure 20B:
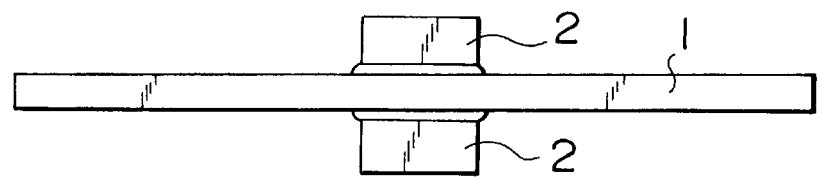

Types of weld joints tested were those shown in FIGS. 20A and 20B as well as in FIG. 7, FIG. 8, FIGS. 10A and 10B, FIG. 11, FIG. 13A to FIG. 13D and FIG. 19A. The detailed characteristics of the weld joints are tabulated in Table 2-1, Table 2—2 and Table 2-3 that follow.

The welding materials used in the tests are tabulated in Table 1 in which welding materials A, B, C and D were formulated within the scope of the present invention. The welding material H was of a conventional class. Welding materials E, F and G failed to meet with the inventive equation (1) as regards the contents of elements; that is, they were outside the limitations of the invention and hence were used for comparative purposes. In Table 1, all the numerical values concerning the compositions were expressed as wt %, with the balance iron and incidental elements.

With various combinations listed in Tables 2-1 to Table 2-3, weld joints were prepared and subjected to a fatigue test under pulsating tension at room temperature in an atmospheric environment. The test results are indicated in terms of that fatigue strength determined to be equivalent to a breaking lifetime of $2 \times 10^6$ cycles.

In regard to weld joints No. 1 to No. 8 prepared by fillet welding and listed in Table 2-1, it was found that welding materials A to D (weld joint No. 1 to No. 4) having a martensite transformation-initiating temperature of 170 to 250° C. were capable of exhibiting radically improved fatigue strength as compared to welding material H of the prior art (weld joint No. 8). As evidenced by weld joint No. 5 to No. 7, no improvements in fatigue strength accrued from welding materials that contained Ni and Cr but fell outside the scope of the present invention. As for weld joints Nos. 5 and 7, welding materials E and G revealed no rise in fatigue strength because they had a martensite transformation-initiating temperature that was not less than 250° C., and hence, the resulting weld metals became contracted during cooling after martensite transformation. Further, welding material F relating to weld joint No. 6 had a martensite transformation-initiating temperature or Ms point lower than room temperature, thus failing to produce martensite transformation in the course of after-weld cooling to working temperature, and ultimately causing an increase in residual tensile stress.

Figure 17:
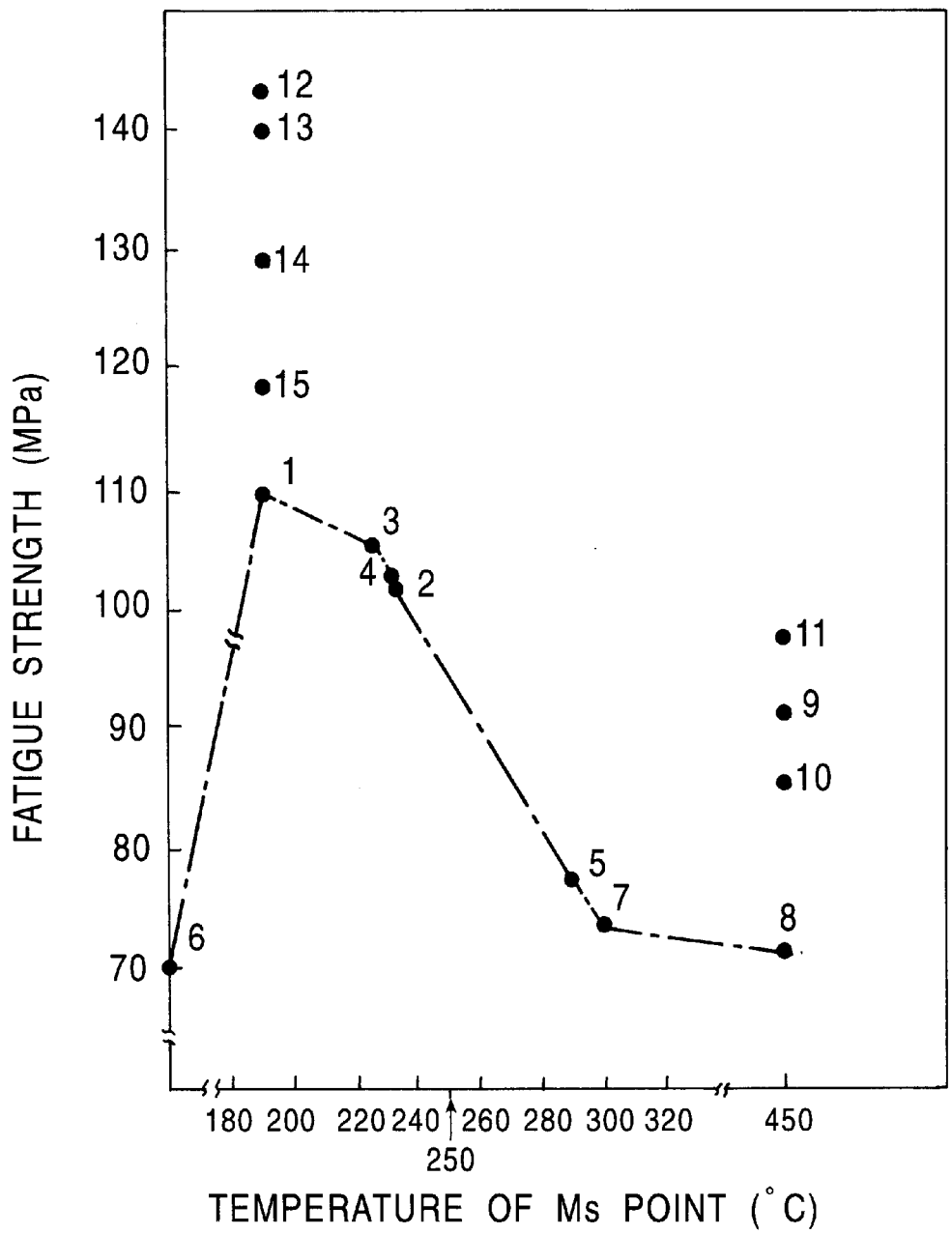
FIG. 17 is a graph showing the relationship between the initiation temperature of martensite transformation, on the one hand, and fatigue strength on the other.
Figure 18:
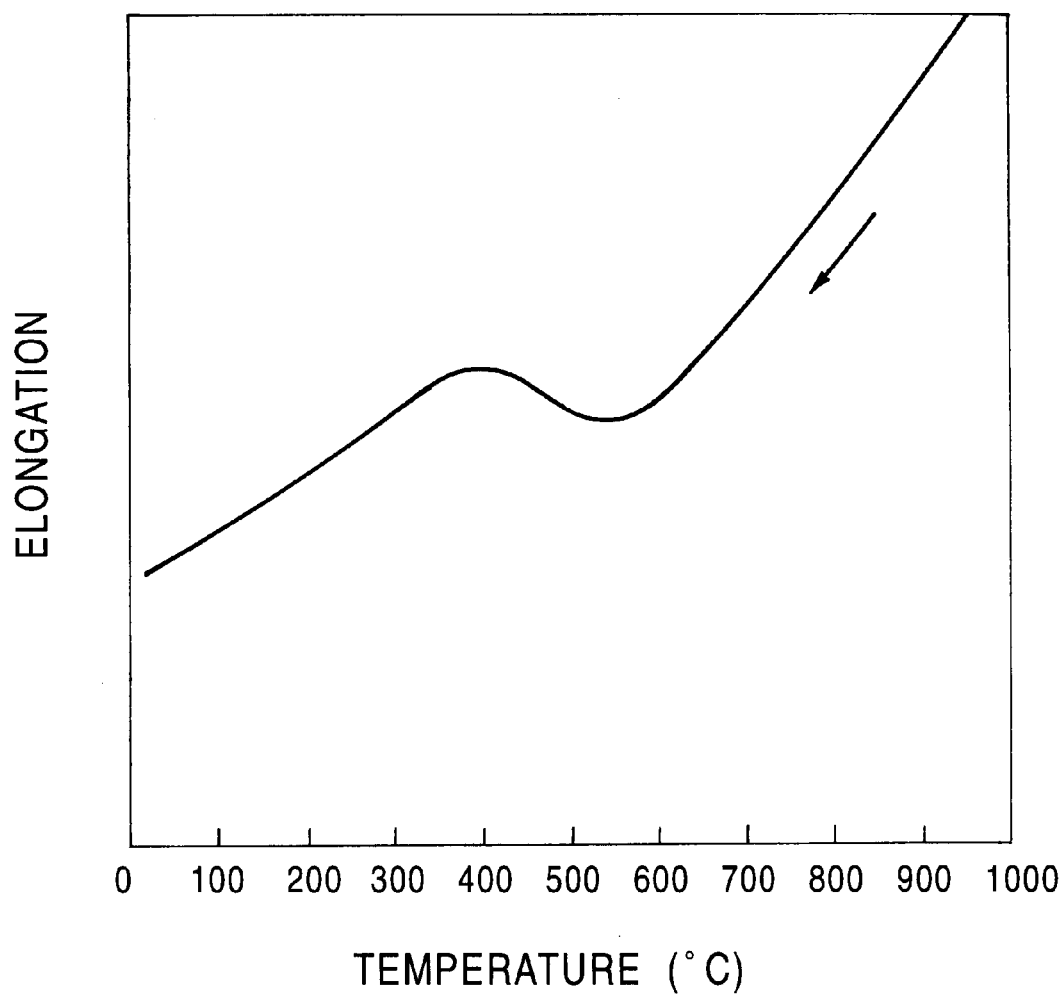
FIG. 18 is a graph showing weld metal contracting during cooling after welding.

Based on the conditions tabulated in Table 2-1, Table 2—2 and Table 2-3, the relationship between the martensite transformation-initiating point Ms of the test welding material and the fatigue strength of the finished weld joint was examined, with the results plotted in FIG. 17.

The results of FIG. 17 reveal the following findings. When examination is made of weld joints No. 1 to No. 8 which were prepared by the use of a conventional welding method except for use of the novel welding materials of the present invention, these weld joints showed a behavior indicated by a dot-and-dash line in FIG. 17. This surprisingly but factually establishes that when use is made of the welding materials of the invention with a martensite transformation-initiating point of below about 250° C. but not less than about 170° C., the fatigue strength of the weld can be effectively enhanced even if a conventional welding procedure is employed.

In addition, weld joints Nos. 8 and 10 reveal that the fatigue strength can be effectively improved with the sequences of welding simply varied.

TABLE 1

| Welding material | C | Si | Mn | Ni | Cr | Mo | Nb | *Ms (° C.) | Remark |
|---|---|---|---|---|---|---|---|---|---|
| A | 0.025 | 0.33 | 0.70 | 10.00 | 10.0 | 0.13 | — | 190(173) | Example |
| B | 0.040 | 0.33 | 0.60 | 5.24 | 13.0 | 0.31 | 0.15 | 232(211) | Example |
| C | 0.026 | 0.32 | 0.71 | 9.90 | 8.12 | 0.14 | 0.07 | 226(218) | Example |
| D | 0.022 | 0.31 | 0.65 | 6.26 | 12.5 | 0.15 | — | 235(216) | Example |
| E | 0.025 | 0.33 | 0.68 | 4.12 | 12.6 | 0.14 | 0.13 | 290 | Comparative Example |
| F | 0.025 | 0.31 | 0.71 | 8.14 | 18.2 | 0.11 | — | <0 | Comparative Example |
| G | 0.023 | 0.32 | 0.72 | 9.50 | 5.3 | 0.13 | 0.10 | 300 | Comparative Example |
| H | 0.06 | 0.45 | 0.98 | — | — | 0.46 | — | 450 | Comparative Example |

*MS points: measurement value
*Parentheses: calculated value based on the equation (1) of this disclosure

TABLE 2-1

| No. of weld joint | Type of weld joint | Welding material | Mode of heat inertia | Grooving of subplate | Main plate-subplate space (mm) | Welding procedure | 2 × 10$^6$ - fatigue strength (MPa) | *After-weld temperature of weld metal | Remark |
|---|---|---|---|---|---|---|---|---|---|
| 1 | FIG. 20(a) | A | Main plate and rib plate | Not grooved | 0 | FIG. 20(b) | 110 | | Example |
| 2 | FIG. 20(a) | B | Main plate and rib plate | Not grooved | 0 | FIG. 20(b) | 103 | | Example |
| 3 | FIG. 20(a) | C | Main plate and rib plate | Not grooved | 0 | FIG. 20(b) | 106 | | Example |
| 4 | FIG. 20(a) | D | Main plate and rib plate | Not grooved | 0 | FIG. 20(b) | 105 | | Example |
| 5 | FIG. 20(a) | E | Main plate and rib plate | Not grooved | 0 | FIG. 20(b) | 78 | | Comparative Example |
| 6 | FIG. 20(a) | F | Main plate and rib plate | Not grooved | 0 | FIG. 20(b) | 70 | | Comparative Example |
| 7 | FIG. 20(a) | G | Main plate and rib plate | Not grooved | 0 | FIG. 20(b) | 74 | | Comparative Example |
| 8 | FIG. 20(a) | H | Main plate and rib plate | Not grooved | 0 | FIG. 20(b) | 72 | | Prior Art |
| 9 | FIG. 20(a) | H | Main plate only | Not grooved | 0 | FIG. 4 | 92 | | Example |
| 10 | FIG. 20(a) | H | Main plate and rib plate | Not grooved | 0 | FIG. 4 | 86 | | Example |
| 11 | FIG. 20(a) | H | Main plate only | Not grooved | 0 | FIG. 6 | 98 | | Example |
| 12 | FIG. 20(a) | A | Main plate only | Not grooved | 0 | FIG. 4 | 143 | | Example |
| 13 | FIG. 20(a) | A | Main plate only | Not grooved | 0 | FIG. 6 | 140 | | Example |
| 14 | FIG. 20(a) | A | Main plate and rib plate | Not grooved | 0 | FIG. 4 | 128 | | Example |

*Blank columns represent no temperature control applied and temperatures not identified.

TABLE 2-2

| No. of weld joint | Type of weld joint | Welding material | Mode of heat inertia | Grooving of subplate | Main plate-subplate space (mm) | Welding procedure | 2 × 10$^6$ - fatigue strength (MPa) | *After-weld temperature of weld metal | Remark |
|---|---|---|---|---|---|---|---|---|---|
| 15 | FIG. 20(a) | A | Main plate only | Not grooved | 0 | FIG. 20(b) | 119 | | Example |
| 16 | FIG. 7 | A | Main plate only | Grooved | 0 | FIG. 4 | 148 | | Example |
| 17 | FIG. 7 | A | Main plate only | Grooved | 0 | FIG. 20(b) | 123 | | Example |
| 18 | FIG. 20(a) | A | Main plate only | Not grooved | 3 | FIG. 4 | 155 | | Example |

TABLE 2-2-continued

| No. of weld joint | Type of weld joint | Welding material | Mode of heat inertia | Grooving of subplate | Main plate-subplate space (mm) | Welding procedure | $2 \times 10^6$ - fatigue strength (MPa) | *After-weld temperature of weld metal | Remark |
| --- | --- | --- | --- | --- | --- | --- | --- | --- | --- |
| 19 | FIG. 20(a) | A | Main plate only | Not grooved | 3 | FIG. 20(b) | 128 | | Example |
| 20 | FIG. 8 | A | Main plate only | Grooved | 5 | FIG. 4 | 171 | | Example |
| 21 | FIG. 8 | A | Main plate and rib plate | Grooved | 5 | FIG. 4 | 136 | | Example |
| 22 | FIG. 8 | A | Main plate only | Grooved | 5 | FIG. 20(b) | 150 | | Example |
| 23 | FIG. 8 | A | Main plate only | Grooved | 7 | FIG. 20(b) | 154 | | Example |
| 24 | FIG. 20(a) | A | Main plate only | Grooved | 2 | FIG. 4 | 193 | Not less than Ms point | Example |
| 25 | FIG. 20(a) | A | Main plate only | Not grooved | 0 | FIG. 5 | 150 | | Example |
| 26 | FIG. 20(a) | A | Not preheated | Not grooved | 0 | FIG. 5 | 125 | | Example |
| 27 | FIG. 20(a) | A | Main plate and rib plate | Not grooved | 0 | FIG. 5 | 130 | | Example |
| 28 | FIG. 20(a) | H | Main plate only | Not grooved | 0 | FIG. 5 | 100 | | Example |

*Blank columns represent no temperature control applied and temperatures not identified.

TABLE 2-3

Figure 13A:
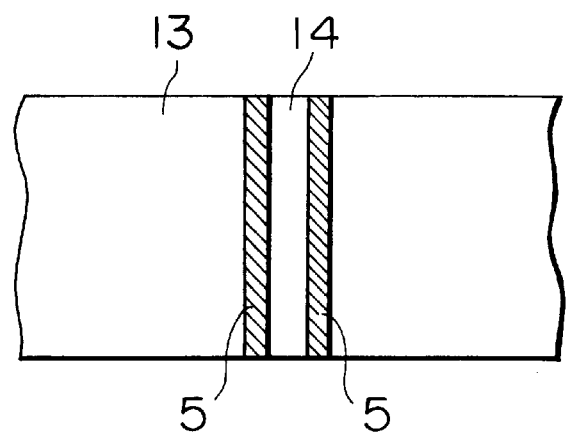
FIGS. 13A, 13B, 13C and 13D are views of cruciform joints in accordance with the invention, FIG. 13A being a plan view, FIG. 13B being a side elevational view of FIG. 13A, FIG. 13C being a plan view, and FIG. 13D being a side elevational view of FIG. 13C.
Figure 13B:
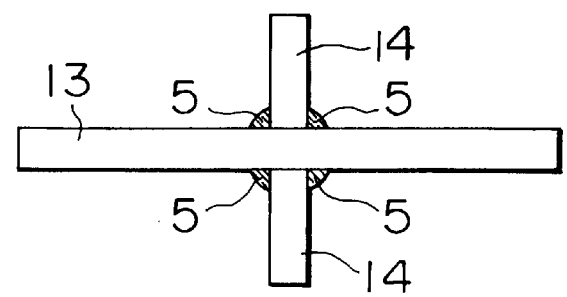
Figure 13C:
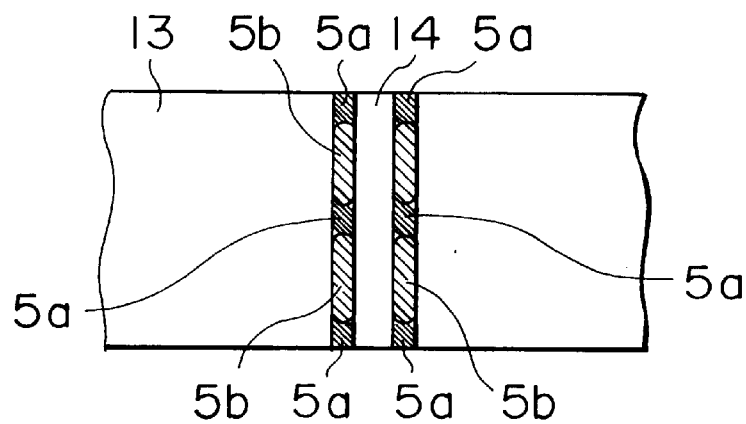
Figure 13D:
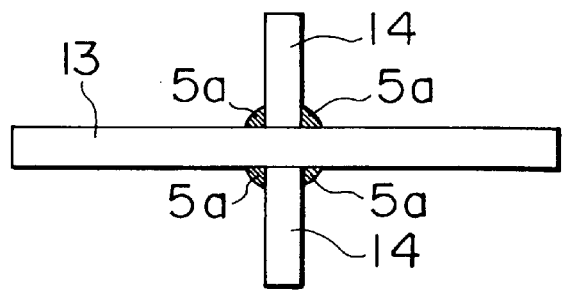
Figure 14A:
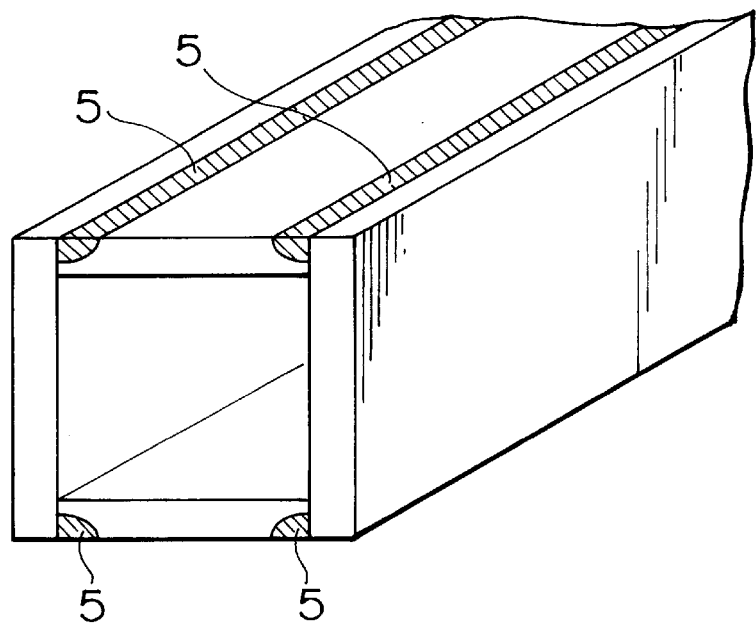
FIGS. 14A and 14B are views of tetrahedral assembly boxes welded according to the invention, FIG. 14A being a view of one form of welding, and 14B being a view of another form of welding.
Figure 14B:
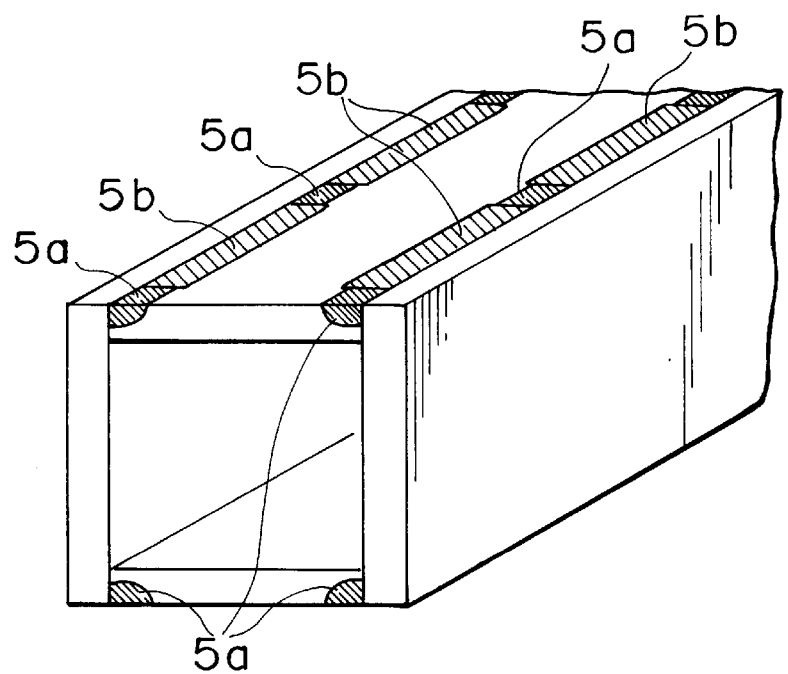
Figure 15A:
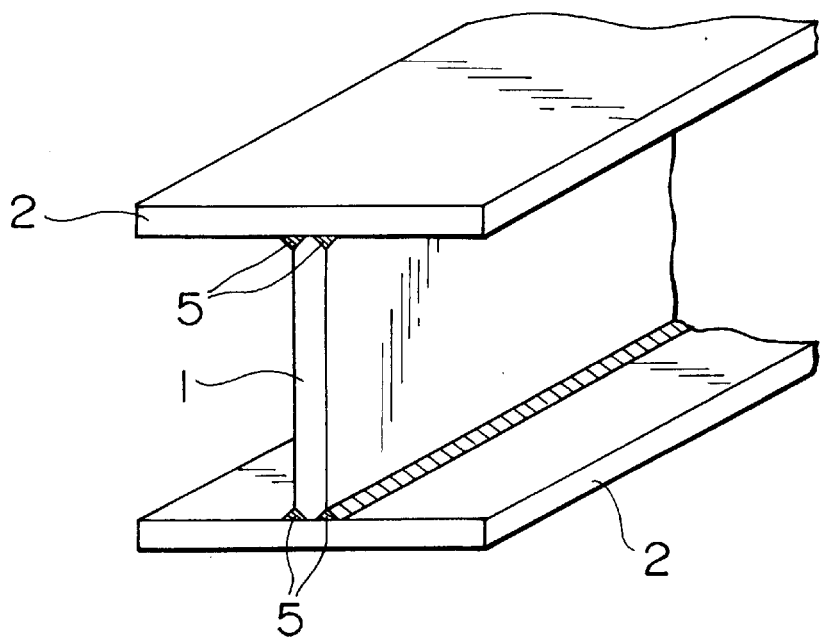
FIGS. 15A and 15B are views of a welded H-shaped steel piece according to the invention, FIG. 15A being a view of one form of welding, and 15B being a view of another form of welding.
Figure 15B:
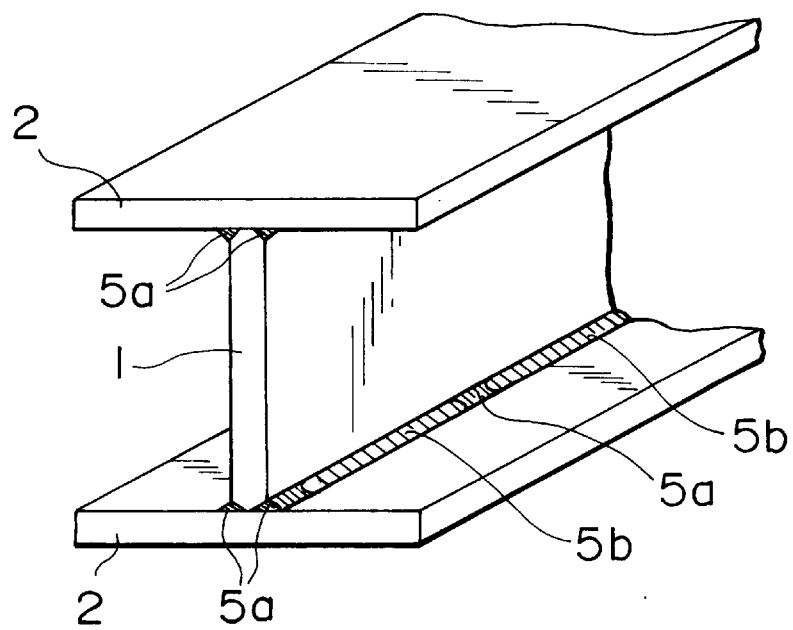
Figure 19B:
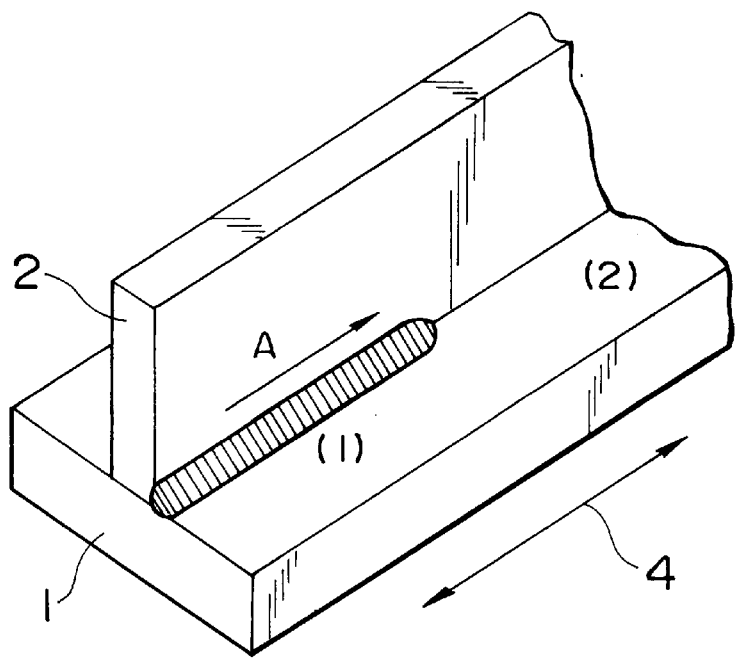

| No. of weld joint | Type of weld joint | Welding material | Mode of heat inertia | Grooving of subplate | Main plate-subplate space (mm) | Welding procedure | $2 \times 10^6$ - fatigue strength (MPa) | *After-weld temperature of weld metal | Remark |
| --- | --- | --- | --- | --- | --- | --- | --- | --- | --- |
| 29 | FIG. 20(a) | A | Main plate only | Grooved | 2 | FIG. 5 | 200 | Not less than Ms point | Example |
| 30 | FIG. 20(a) | H | Main plate only | Not grooved | 0 | FIG. 20(b) | 75 | | Prior Art |
| 31 | FIG. 19(a) | A | Main plate only | Not grooved | 0 | FIG. 9 | 250 | | Example |
| 32 | FIG. 19(a) | A | Main plate and subplate | Not grooved | 0 | FIG. 9 | 233 | | Example |
| 33 | FIG. 19(a) | H | Main plate only | Not grooved | 0 | FIG. 9 | 150 | | Example |
| 34 | FIG. 19(a) | A | Main plate and subplate | Not grooved | 0 | FIG. 19(b) | 210 | | Example |
| 35 | FIG. 19(a) | H | Main plate and subplate | Not grooved | 0 | FIG. 19(b) | 110 | | Prior Art |
| 36 | FIG. 10 | A | Not preheated | Grooved | o | — | 225 | | Example |
| 37 | FIG. 10 | H | Not preheated | Grooved | u | — | 152 | | Prior Art |
| 38 | FIG. 11 | A | Not preheated | Grooved | o | — | 207 | | Example |
| 39 | FIG. 13 | A | Not preheated | Not grooved | 0 | FIG. 13(a) | 204 | | Example |
| 40 | FIG. 13 | H | Not preheated | Not grooved | 0 | FIG. 13(b) | 145 | | Example |
| 41 | FIG. 13 | H | Not preheated | Not grooved | 0 | FIG. 13(a) | 103 | | Prior Art |
| 42 | FIG. 20(a) | A | Main plate only | Grooved | 2 | FIG. 4 | 230 | Heating of weld at 650° C. after welding | Example |

*Blank columns represent no temperature control applied and temperatures not identified.

Inspection of weld joints Nos. 9 and 11 showed that the fatigue strength was effectively improved by preheating of only the main plate 1.

As demonstrated by weld joints Nos. 12 and 13, a sharp improvement in fatigue strength was achieved when the main plate 1 was preheated by the method of the present invention, when the welding procedure of the invention was followed and also when the welding material of the invention was employed.

Checking of weld joints Nos. 12 and 16 revealed that fatigue strength was further enhanced by use of the grooving treatment.

Checking of weld joints Nos. 8 and 17 revealed that fatigue strength was greatly improved even when only both the grooving treatment and the welding material were based on the present invention.

Checking of weld joints Nos. 12 and 18 or weld joints Nos. 15 and 19 revealed that fatigue strength was further improved by incorporating the process step of gapping.

Checking of weld joints Nos. 16 and 20 revealed that further improvements in fatigue strength was made possible when grooving and gapping were employed in combination.

In this connection, examination of weld joint No. 21 demonstrated that in order to protect the rib plate against fatigue cracking, preheating on a rib plate side can lead to substantially the same magnitude of fatigue strength as in weld joint No. 16.

In regard to weld joint No. 24, welding was used in which all of the welding steps were brought to an end while all the weld metals were being held at a higher temperature than the martensite transformation-initiating temperature. When all the weld metals were so controlled as to have a temperature above the martensite transformation-initiating temperature at the time the welding was completed, a higher fatigue strength was attained than in the case of weld joint No. 20 noted above.

Checking of weld joint No. 42 showed that fatigue strength can be further improved when, after completion of welding, the weld zone was wholly heated at 650° C., that is, higher than the minimum austenitizing temperature, and then subjected to cooling.

Checking of weld joint Nos. 19 and 22 showed that improved fatigue strength was obtained when the gap between the main and rib plates was set at 5 mm, and also with grooving effected.

In weld joint No. 23, a gap of 7 mm was provided between the main plate and the rib plate. No significant rise in fatigue strength was obtainable as compared to weld joint No. 22 with a gap of 5 mm.

Weld joints Nos. 25 to 29 were examples in which the present invention was applied in performing a three-layered sort of welding by fillet welding as illustrated in FIG. 5A. Weld joint No. 30 was an example in which a three-layered lamination was formed by repeating three times the welding sequences (1)–(6) of FIG. 21.

Checking of weld joints Nos. 30 and 27 revealed that the fatigue strength was improved by the use of the welding procedure shown in FIG. 5A.

Checking of weld joints Nos. 25 to 27 reveals that use of the welding material according to the present invention contributed further to enhanced fatigue strength. Another inspection of weld joint No. 29 evidenced that the fatigue strength was noticeably enhanced with a gap between the main and rib plates set at 2 mm, and also with grooving effected.

Weld joints Nos. 31 to 34 were examples in which the present invention was used in forming T-shaped joints.

Examination of weld joint No. 33 shows that use of the welding procedure shown in FIG. 9 exhibited improved fatigue strength when compared to weld joint No. 35, i.e., a conventional T-shaped joint.

Checking of weld joints Nos. 32 and 31 revealed that a further rise in fatigue strength was possible by use of welding material A according to the present invention and by preheating of the main plate only.

Moreover, the present invention when applied to butt welding produced a sharp rise in fatigue strength, as can be found from weld joints Nos. 36 to 38.

In this respect, inspection of weld joints Nos. 37 and 38 demonstrated that fatigue strength can be effectively improved even when only the outermost weld layer is formed in accordance with the invention.

As evidenced by weld joints Nos. 39 and 41, fatigue strength was markedly enhanced also when a criss-crossed weld joint was prepared by fillet welding according to the invention.

Figure 21:
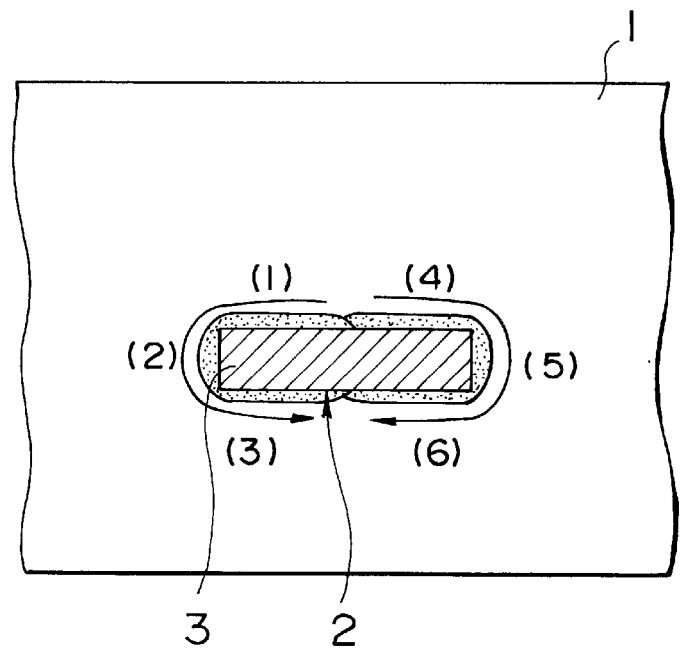
FIG. 21 is a view explanatory of the procedure of a welding method of prior art.

Next, weld joints shown in FIGS. 20A and 20B were prepared with use of welding material H and in accordance with the welding procedure of FIG. 21. The weld joint was then subjected to a fatigue test under pulsating tension at a stress of 120 MPa. The test was brought to an end immediately after a fatigue crack was observed by visual inspection at two longitudinally opposed welding toe of the joint. The two opposed welding toes were thereafter padded by repair welding with use of welding materials A and H. Fatigue testing was repeated. The fatigue strength of $2 \times 10^6$ after padding by repair welding was determined to be 170 MPa in the case of welding material A and 82 MPa in the case of welding material H.

As described and shown hereinbefore, the welding method of the present invention has great advantage as it enables the finished weld joint to achieve enhanced fatigue strength with martensite transformation utilized, but with no need for after-weld treatments (an edging treatment of a special type) such as grinding and the like or cooling treatment.

With use of a specified welding material according to the invention, improved fatigue strength was discovered to be conferred upon the finished weld joint, even when a welding method in common use was performed.

Further, we have discovered that two steel members to be welded can be joined to each other simply by varying the welding sequences of conventional welding methods such that a finished weld joint is obtained that has significantly improved fatigue strength. A further rise in fatigue strength is made possible in the weld joint by incorporating the process step of preheating.

Although this invention has been described with reference to many specific examples of weld metal compositions and welding procedures, it will be understood that many alternatives too numerous to mention are contemplated and that the use of equivalent or partial welding procedures, modifications and reversals of the sequence of welding steps, and inclusion of non-interfering ingredients in the metal alloy or the members of the weld joint may be effected, all within the spirit and scope of the invention as defined in the appended claims.

What is claimed is:

1. In a method of welding together low-alloy steel members for forming a welded structure, in which said low-alloy steel members are joined by weld metal, the steps which comprise welding said steel members with a welding material to form a weld metal joining said metal members, said weld metal being formed from said welding step to cause martensite transformation during cooling after performing said welding step, whereby said weld metal expands to a greater degree at room temperature than at the temperature at which said martensite transformation takes place, wherein said welding material which produces said weld metal comprises C in an amount equal to or less than about 0.10 wt %, Cr in an amount of about 8.0 to 13.0 wt %, Ni in an amount of about 5.0 to 12.0 wt %, Si in an amount of about 0.2 to 1.0 wt %, Mn in an amount of about 0.4 to 2.5 wt %, Mo in an amount of not more than about 4.0 wt % and Nb in an amount of not more than about 1.0 wt %, and wherein the contents of C, Cr, Ni, Si, Mn, Mo and Nb in said welding material have proportions which comply substantially with the equation (1):

$$170 \leq 719 - (795 \times C\,wt\%) - (23.7 \times Cr\,wt\%) - \quad (1)$$
$$(26.5 \times Ni\,wt\%) - (35.55 \times Si\,wt\%) - (13.25 \times Mn\,wt\%) -$$
$$(23.7 \times Mo\,wt\%) - (11.85 \times Nb\,wt\%) < 250.$$

2. The welding method according to claim 1, wherein said steel members are intermittently welded with provision of spaces between said welds, followed by further welding said steel members at said spaces.

3. The welding method according to claim 1, wherein one of said steel members adapted to be welded at a designated weld zone is a main plate and another is a sub-plate, and wherein said main plate and/or sub-plate are preheated adjacent said weld zone to thereby maintain said main plate at a higher temperature than at the weld zone of said sub-plate.

4. The welding method according to claim 1, wherein said welding material is a ferrous alloy having a martensite transformation temperature that is less than about 250° C. but of not less than about 170° C.

* * * * *

UNITED STATES PATENT AND TRADEMARK OFFICE
CERTIFICATE OF CORRECTION

PATENT NO.: 6,059,177
DATED: May 9, 2000
INVENTOR(S): Osamu Watanabe, Akihiko Ohta, Chiaki Shiga and Satoshi Nishijima It is certified that error appears in the above-identified patent and that said Letters Patent is hereby corrected as shown below:

On the Title page, under [73] Assignee, please insert --National Research Institute for Metals--.

In Column 12, line 25, please change "5 a" to --5a--.

In Columns 17 and 18, under Table 2-3, 6th Column, 9th Row, please change "o" to --0--;
    6th Column, 10th Row, please change "u" to --0--; and
    6th Column, 11th Row, please change "o" to --0--.

Signed and Sealed this

First Day of May, 2001

*Attest:*

NICHOLAS P. GODICI

*Attesting Officer*    *Acting Director of the United States Patent and Trademark Office*